United States Patent
Jang

(10) Patent No.: US 11,949,851 B2
(45) Date of Patent: Apr. 2, 2024

(54) INTER PREDICTION METHOD AND APPARATUS USING CPR-BASED MMVD

(71) Applicant: LG ELECTRONICS INC., Seoul (KR)

(72) Inventor: Hyeongmoon Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 321 days.

(21) Appl. No.: 17/419,917

(22) PCT Filed: Jan. 3, 2020

(86) PCT No.: PCT/KR2020/000119
§ 371 (c)(1),
(2) Date: Jun. 30, 2021

(87) PCT Pub. No.: WO2020/141932
PCT Pub. Date: Jul. 9, 2020

(65) Prior Publication Data
US 2022/0086427 A1 Mar. 17, 2022

Related U.S. Application Data

(60) Provisional application No. 62/788,137, filed on Jan. 4, 2019.

(51) Int. Cl.
*H04N 19/105* (2014.01)
*H04N 19/132* (2014.01)
(Continued)

(52) U.S. Cl.
CPC ......... *H04N 19/105* (2014.11); *H04N 19/132* (2014.11); *H04N 19/139* (2014.11); *H04N 19/176* (2014.11); *H04N 19/513* (2014.11)

(58) Field of Classification Search
CPC .. H04N 19/105; H04N 19/132; H04N 19/139; H04N 19/176; H04N 19/513
(Continued)

(56) References Cited

U.S. PATENT DOCUMENTS

| 2005/0212974 A1* | 9/2005 | Michel | G06T 7/223 |
| | | | 348/699 |
| 2005/0213663 A1* | 9/2005 | Aoyama | G06T 7/223 |
| | | | 375/240.24 |

(Continued)

FOREIGN PATENT DOCUMENTS

| KR | 10-2017-0047234 A | 5/2017 |
| KR | 10-2018-0063094 A | 6/2018 |
| WO | 2017/206803 A1 | 12/2017 |

OTHER PUBLICATIONS

Li et al. "Non-CE8: Combination of MMVD and CPR Mode," JVET Jan. 9-18, 2019 (Year: 2019).*

(Continued)

*Primary Examiner* — Matthew David Kim
(74) *Attorney, Agent, or Firm* — Bryan Cave Leighton Paisner LLP

(57) ABSTRACT

An image decoding method performed by a decoding apparatus according to the present document comprises the steps of: determining that a merge with motion vector difference (MMVD) mode has been applied to a current block that is a current picture referencing (CPR) coding block referring to a current picture; deriving a base motion information candidate for the current block on the basis of candidate blocks neighboring the current block; generating prediction samples for the current block on the basis of the base motion information candidate; and generating reconstruction samples for the current block on the basis of the prediction samples, wherein the base motion information candidate is
(Continued)

derived depending on whether the neighboring candidate blocks are CPR coding blocks.

12 Claims, 12 Drawing Sheets

(51) Int. Cl.
  *H04N 19/139* (2014.01)
  *H04N 19/176* (2014.01)
  *H04N 19/513* (2014.01)

(58) Field of Classification Search
  USPC .................................................. 375/240.02
  See application file for complete search history.

(56) References Cited

U.S. PATENT DOCUMENTS

| | | | | |
|---|---|---|---|---|
| 2017/0099495 | A1* | 4/2017 | Rapaka | H04N 19/523 |
| 2019/0222859 | A1* | 7/2019 | Chuang | H04N 19/105 |
| 2020/0021845 | A1* | 1/2020 | Lin | H04N 19/105 |
| 2020/0213591 | A1* | 7/2020 | Sun | H04N 19/46 |
| 2021/0274167 | A1* | 9/2021 | Liu | H04N 19/126 |
| 2021/0314560 | A1* | 10/2021 | Lai | H04N 19/96 |
| 2021/0352314 | A1* | 11/2021 | Zhang | H04N 19/105 |
| 2021/0360232 | A1* | 11/2021 | Liu | H04N 19/96 |
| 2021/0400294 | A1* | 12/2021 | Chen | H04N 19/137 |

OTHER PUBLICATIONS

Jang et al. "Non-CE8: MMVD Harmonization with CPR," JVET Jan. 9-18, 2019 (Year: 2019).*

Li, Yiming et al., Non-CE8: Combination of MMVD and CPR mode. JVET-M0541-v1. Joint Video Experts Team (JVET) of ITU-T SG 16 WP 3 and ISO/IEC JTC 1/SC 29/WG 11. 13th Meeting: Marrakech, MA. Jan. 3, 2019, pp. 1-7.

Jang, Hyeongmoon et al., Non-CE8: MMVD harmonization with CPR. JVET-M0341. Joint Video Experts Team (JVET) of ITU-T SG 16 WP 3 and ISO/IEC JTC 1/SC 29/WG 11. 13th Meeting: Marrakech, MA. Jan. 3, 2019, pp. 1-4.

* cited by examiner ated Application No. 62/788,137, filed on Jan. 4, 2019, which is hereby incorporated by reference herein in their entirety.

INTER PREDICTION METHOD AND APPARATUS USING CPR-BASED MMVD

This application is the National Phase of PCT International Application No. PCT/KR2020/000119, filed on Jan. 3, 2020, which claims priority to and the benefit of U.S. Provisional Application No. 62/788,137, filed on Jan. 4, 2019, which is hereby incorporated by reference herein in their entirety.

BACKGROUND OF THE DISCLOSURE

Field of the Disclosure

The present disclosure relates to a video coding technique and, more specifically, to an inter-prediction method and apparatus using current picture referencing (CPR) based merge with motion vector difference (MMVD).

Related Art

The demands for high-resolution and high-quality images and video, such as an ultra-high definition (UHD) image and video of 4K or 8K or more, are recently increasing in various fields. As image and video data become high resolution and high quality, the amount of information or the number of bits that is relatively transmitted is increased compared to the existing image and video data. Accordingly, if image data is transmitted using a medium, such as the existing wired or wireless wideband line, or image and video data are stored using the existing storage medium, transmission costs and storage costs are increased.

Furthermore, interests and demands for immersive media, such as virtual reality (VR), artificial reality (AR) content or a hologram, are recently increasing. The broadcasting of an image and video having image characteristics different from those of real images, such as game images, is increasing.

Accordingly, there is a need for a high-efficiency image and video compression technology in order to effectively compress and transmit or store and playback information of high-resolution and high-quality images and video having such various characteristics.

SUMMARY

An object of the present disclosure is to provide a method and apparatus for improving video coding efficiency.

Another object of the present disclosure is to provide an efficient inter-prediction method and apparatus.

Yet another object of the present disclosure is to provide a method and apparatus for applying merge with motion vector difference (MMVD) in a process of performing current picture referencing (CPR) to improve video coding efficiency.

Still another object of the present disclosure is to provide a method and apparatus for configuring base motion information candidates for MMVD to improve compression performance when MMVD is applied in a process of performing CPR.

According to an embodiment of the present disclosure, an image decoding method performed by a decoding apparatus is provided. The image decoding method includes determining that a merge with motion vector difference (MMVD) mode is applied to a current block which is a current picture referencing (CPR) coding block referring to the current picture, deriving a base motion information candidate for the current block based on neighboring candidate blocks of the current block, generating prediction samples for the current block based on the base motion information candidate, and generating reconstructed samples for the current block based on the prediction samples, wherein the base motion information candidate is derived based on whether the neighboring candidate blocks are CPR coding blocks.

According to another embodiment of the present disclosure, an image encoding method performed by an encoding apparatus is provided. The image encoding method includes determining that a merge with motion vector difference (MMVD) mode is applied to a current block which is a current picture referencing (CPR) coding block referring to the current picture, deriving a base motion information candidate for the current block based on neighboring candidate blocks of the current block, generating prediction samples for the current block based on the base motion information candidate, deriving residual samples based on the prediction samples, and encoding image information including information on the residual samples, wherein the base motion information candidate is derived based on whether the neighboring candidate blocks are CPR coding blocks.

According to the present disclosure, it is possible to improve overall image/video compression efficiency.

According to the present disclosure, it is possible to reduce computational complexity through efficient inter-prediction and improve overall coding efficiency.

According to the present disclosure, it is possible to reduce complexity for performance and improve compression performance by providing a method of configuring base motion candidates for merge with motion vector difference (MMVD) in a process of performing current picture referencing (CPR).

DESCRIPTION OF EXEMPLARY EMBODIMENTS

Figure 1:
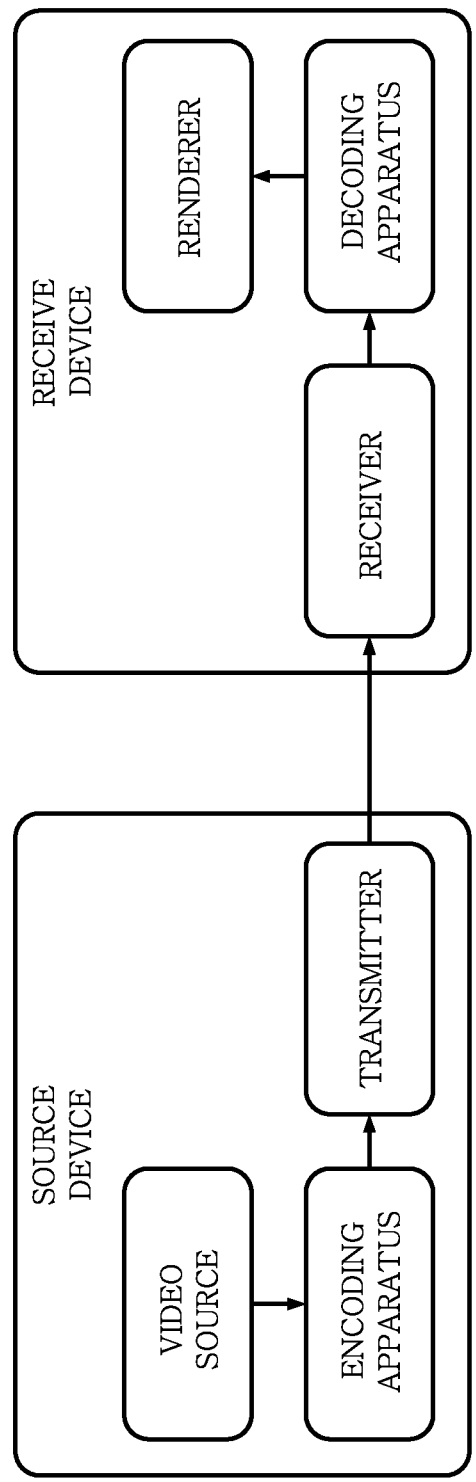
FIG. 1 schematically illustrates an example of a video/image coding system to which embodiments of the present disclosure may be applied.

The present disclosure may be modified in various ways and may have various embodiments, and specific embodiments will be illustrated in the drawings and described in detail. However, this does not intend to limit the present disclosure to the specific embodiments. Terms commonly used in this specification are used to describe a specific embodiment and is not used to limit the technical spirit of the present disclosure. An expression of the singular number includes plural expressions unless evidently expressed otherwise in the context. A term, such as "include" or "have" in this specification, should be understood to indicate the existence of a characteristic, number, step, operation, element, part, or a combination of them described in the specification and not to exclude the existence or the possibility of the addition of one or more other characteristics, numbers, steps, operations, elements, parts or a combination of them.

Meanwhile, elements in the drawings described in the present disclosure are independently illustrated for convenience of description related to different characteristic functions. This does not mean that each of the elements is implemented as separate hardware or separate software. For example, at least two of elements may be combined to form a single element, or a single element may be divided into a plurality of elements. An embodiment in which elements are combined and/or separated is also included in the scope of rights of the present disclosure unless it deviates from the essence of the present disclosure.

Hereinafter, preferred embodiments of the present disclosure are described more specifically with reference to the accompanying drawings. Hereinafter, in the drawings, the same reference numeral is used in the same element, and a redundant description of the same element may be omitted.

The present disclosure relates to video/image coding. For example, the methods/embodiments disclosed in the present disclosure may be applied to a method disclosed in the versatile video coding (VVC), the EVC (essential video coding) standard, the AOMedia Video 1 (AV1) standard, the 2nd generation of audio video coding standard (AVS2), or the next generation video/image coding standard (ex. H.267 or H.268, etc.).

The present disclosure presents various embodiments of video/image coding, and the embodiments may be performed in combination with each other unless otherwise mentioned.

In the present disclosure, video may refer to a series of images over time. Picture generally refers to a unit representing one image in a specific time zone, and a slice/tile is a unit constituting part of a picture in coding. The slice/tile may include one or more coding tree units (CTUs). One picture may consist of one or more slices/tiles. One picture may consist of one or more tile groups. One tile group may include one or more tiles. A brick may represent a rectangular region of CTU rows within a tile in a picture. A tile may be partitioned into multiple bricks, each of which consisting of one or more CTU rows within the tile. A tile that is not partitioned into multiple bricks may be also referred to as a brick. A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consist of either a number of complete tiles or only a consecutive sequence of complete bricks of one tile. Tile groups and slices may be used interchangeably in the present disclosure. For example, in the present disclosure, a tile group/tile group header may be called a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows.

In the present disclosure, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A, B, C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in the present disclosure should be interpreted to indicate "additionally or alternatively."

FIG. 1 schematically illustrates an example of a video/image coding system to which embodiments of the present disclosure may be applied.

Referring to FIG. 1, a video/image coding system may include a first device (source device) and a second device (receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/ image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

Figure 2:
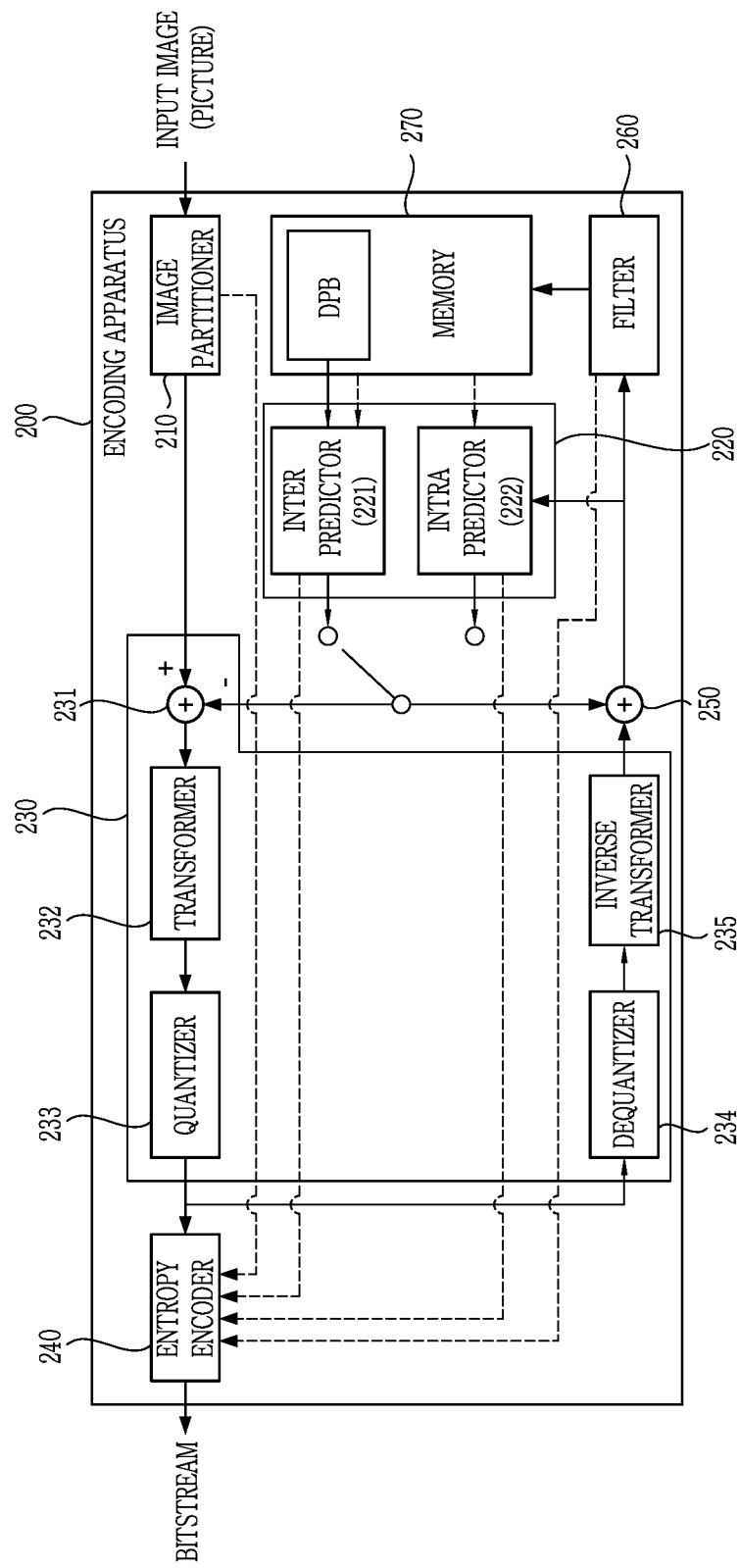
FIG. 2 is a schematic diagram illustrating a configuration of a video/image encoding apparatus to which embodiments of the present disclosure may be applied.

FIG. 2 is a schematic diagram illustrating a configuration of a video/image encoding apparatus to which the embodiment(s) of the present document may be applied. Hereinafter, the video encoding apparatus may include an image encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter-predictor 221 and an intra-predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. an encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to the present disclosure may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, predicted sample array) output from the inter-predictor 221 or the intra-predictor 222 is subtracted from an input image signal (original block, original sample array) to generate a residual signal residual block, residual sample array), and the generated residual signal is transmitted to the transformer 232. In this case, as shown, a unit for subtracting a prediction signal (predicted block, predicted sample array) from the input image signal (original block, original sample array) in the encoder 200 may be called a subtractor 231. The predictor may perform prediction on a block to be processed (hereinafter, referred to as a current block) and generate a predicted block including predicted samples for the current block. The predictor may determine whether intra-prediction or inter-prediction is applied on a current block or CU basis. As described later in the description of each prediction mode, the predictor may generate various information related to prediction, such as prediction mode information, and transmit the generated information to the entropy encoder 240. The information on the prediction may be encoded in the entropy encoder 240 and output in the form of a bitstream.

The intra-predictor 222 may predict the current block by referring to the samples in the current picture. The referred samples may be located in the neighborhood of the current block or may be located apart according to the prediction mode. In the intra-prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra-predictor 222 may determine the prediction mode applied to the current block by using a prediction mode applied to a neighboring block.

The inter-predictor 221 may derive a predicted block for the current block based on a reference block (reference sample array) specified by a motion vector on a reference picture. Here, in order to reduce the amount of motion information transmitted in the inter-prediction mode, the motion information may be predicted in units of blocks, subblocks, or samples based on correlation of motion information between the neighboring block and the current block. The motion information may include a motion vector and a reference picture index. The motion information may further include inter-prediction direction (L0 prediction, L1 prediction, Bi prediction, etc.) information. In the case of inter-prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter-predictor 221 may configure a motion information candidate list based on neighboring blocks and generate information indicating which candidate is used to derive a motion vector and/or a reference picture index of the current block. Inter-prediction may be performed based on various prediction modes. For example, in the case of a skip mode and a merge mode, the inter-predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra-prediction or inter-prediction to predict one block but also simultaneously apply both intra-prediction and inter-prediction. This may be called combined inter and intra-prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter-prediction in that a reference block is derived in the current picture. That is, the IBC may use at least one of the inter-prediction techniques described in the present disclosure. The palette mode may be considered as an example of intra coding or intra-prediction. When the palette mode is applied, a sample value within a picture may be signaled based on information on the palette table and the palette index.

The prediction signal generated by the predictor (including the inter-predictor 221 and/or the intra-predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a karhunen-loeve transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (ex. values of syntax elements, etc.) together or separately. Encoded information (ex. encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In the present disclosure, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter-predictor 221 or the intra-predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra-prediction of a next block to be processed in the current picture and may be used for inter-prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter-predictor 221. When the inter-prediction is applied through the encoding apparatus, prediction mismatch between the encoding apparatus 200 and the decoding apparatus may be avoided and encoding efficiency may be improved.

The DPB of the memory 270 DPB may store the modified reconstructed picture for use as a reference picture in the inter-predictor 221. The memory 270 may store the motion information of the block from which the motion information in the current picture is derived (or encoded) and/or the motion information of the blocks in the picture that have already been reconstructed. The stored motion information may be transmitted to the inter-predictor 221 and used as the motion information of the spatial neighboring block or the motion information of the temporal neighboring block. The memory 270 may store reconstructed samples of reconstructed blocks in the current picture and may transfer the reconstructed samples to the intra-predictor 222.

Figure 3:
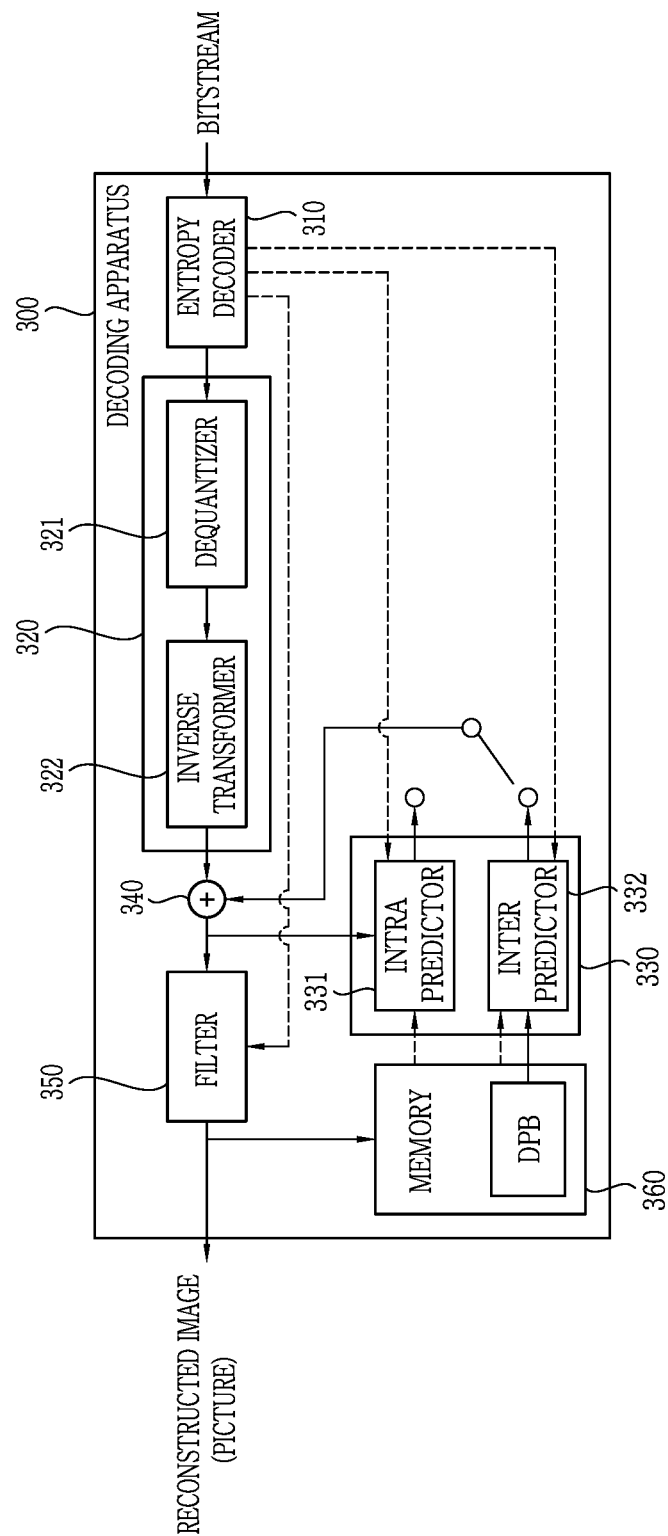
FIG. 3 is a schematic diagram illustrating a configuration of a video/image decoding apparatus to which embodiments of the present disclosure may be applied.

FIG. 3 is a schematic diagram illustrating a configuration of a video/image decoding apparatus to which the embodiment(s) of the present document may be applied.

Referring to FIG. 3, the decoding apparatus 300 may include an entropy decoder 310, a residual processor 320, a predictor 330, an adder 340, a filter 350, a memory 360. The predictor 330 may include an inter-predictor 331 and an intra-predictor 332. The residual processor 320 may include a dequantizer 321 and an inverse transformer 321. The entropy decoder 310, the residual processor 320, the predictor 330, the adder 340, and the filter 350 may be configured by a hardware component (ex. a decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (ex. video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in the present disclosure may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter-predictor 332 and the intra-predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to the present disclosure may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter-predictor 332, and the intra-predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (ex. quantization step size information) and obtain transform coefficients.

The inverse transformer 322 inversely transforms the transform coefficients to obtain a residual signal (residual block, residual sample array).

The predictor may perform prediction on the current block and generate a predicted block including predicted samples for the current block. The predictor may determine whether intra-prediction or inter-prediction is applied to the current block based on the information on the prediction output from the entropy decoder 310 and may determine a specific intra/inter-prediction mode.

The predictor 320 may generate a prediction signal based on various prediction methods described below. For example, the predictor may not only apply intra-prediction or inter-prediction to predict one block but also simultaneously apply intra-prediction and inter-prediction. This may be called combined inter and intra-prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter-prediction in that a reference block is derived in the current picture. That is, the IBC may use at least one of the inter-prediction techniques described in the present disclosure. The palette mode may be considered as an example of intra coding or intra-prediction. When the palette mode is applied, a sample value within a picture may be signaled based on information on the palette table and the palette index.

The intra-predictor 331 may predict the current block by referring to the samples in the current picture. The referenced samples may be located in the neighborhood of the current block or may be located apart according to the prediction mode. In intra-prediction, prediction modes may include a plurality of non-directional modes and a plurality of directional modes. The intra-predictor 331 may determine the prediction mode applied to the current block by using the prediction mode applied to the neighboring block.

The inter-predictor 332 may derive a predicted block for the current block based on a reference block (reference sample array) specified by a motion vector on a reference picture. In this case, in order to reduce the amount of motion information transmitted in the inter-prediction mode, motion information may be predicted in units of blocks, subblocks, or samples based on correlation of motion information between the neighboring block and the current block. The motion information may include a motion vector and a reference picture index. The motion information may further include inter-prediction direction (L0 prediction, L1 prediction, Bi prediction, etc.) information. In the case of inter-prediction, the neighboring block may include a spatial neighboring block present in the current picture and a temporal neighboring block present in the reference picture. For example, the inter-predictor 332 may configure a motion information candidate list based on neighboring blocks and derive a motion vector of the current block and/or a reference picture index based on the received candidate selection information. Inter-prediction may be performed based on various prediction modes, and the information on the prediction may include information indicating a mode of inter-prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter-predictor 332 and/or the intra-predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra-prediction of a next block to be processed in the current picture, may be output through filtering as described below, or may be used for inter-prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter-predictor 332. The memory 360 may store the motion information of the block from which the motion information in the current picture is derived (or decoded) and/or the motion information of the blocks in the picture that have already been reconstructed. The stored motion information may be transmitted to the inter-predictor 260 so as to be utilized as the motion information of the spatial neighboring block or the motion information of the temporal neighboring block. The memory 360 may store reconstructed samples of reconstructed blocks in the current picture and transfer the reconstructed samples to the intra-predictor 331.

In the present disclosure, the embodiments described in the filter 260, the inter-predictor 221, and the intra-predictor 222 of the encoding apparatus 200 may be the same as or respectively applied to correspond to the filter 350, the inter-predictor 332, and the intra-predictor 331 of the decoding apparatus 300. The same may also apply to the unit 332 and the intra-predictor 331.

As described above, in performing video coding, a prediction is performed to enhance compression efficiency. A predicted block including predicted samples for a current block, that is, a target coding block, can be generated through the prediction. In this case, the predicted block includes the predicted samples in a spatial domain (or pixel domain). The predicted block is identically derived in the encoding apparatus and the decoding apparatus. The encoding apparatus can enhance image coding efficiency by signaling, to the decoding apparatus, information on a residual (residual information) between the original block not an original sample value itself of the original block and the predicted block. The decoding apparatus may derive a residual block including residual samples based on the residual information, may generate a reconstructed including reconstructed samples by adding the residual block and the predicted block, and may generate a reconstructed picture including the reconstructed blocks.

The residual information may be generated through a transform and quantization procedure. For example, the encoding apparatus may derive the residual block between the original block and the predicted block, may derive transform coefficients by performing a transform procedure on the residual samples (residual sample array) included in the residual block, may derive quantized transform coefficients by performing a quantization procedure on the transform coefficients, and may signal related residual information to the decoding apparatus (through a bitstream). In this case, the residual information may include information, such as value information, location information, transform scheme, transform kernel, and quantization parameter of the quantized transform coefficients. The decoding apparatus may perform a dequantization/inverse transform procedure based on the residual information, and may derive residual samples (or residual block). The decoding apparatus may generate a reconstructed picture based on the predicted block and the residual block. Furthermore, the encoding apparatus may derive a residual block by dequantizing/inverse-transforming the quantized transform coefficients for reference to the inter-prediction of a subsequent picture, and may generate a reconstructed picture.

Meanwhile, as described above, the inter-prediction may be applied when performing the prediction on the current block. That is, the predictor (more specifically, inter-predictor) of the encoding/decoding apparatus may derive predicted samples by performing the inter-prediction in units of the block. The inter-prediction may represent prediction derived by a method dependent to the data elements (e.g., sample values or motion information) of a picture(s) other than the current picture. When the inter-prediction is applied to the current block, a predicted block (predicted sample array) for the current block may be derived based on a reference block (reference sample array) specified by the motion vector on the reference picture indicated by the reference picture index. In this case, in order to reduce an amount of motion information transmitted in the inter-prediction mode, the motion information of the current block may be predicted in units of a block, a subblock, or a sample based on a correlation of the motion information between the neighboring block and the current block. The motion information may include the motion vector and the reference picture index. The motion information may further include inter-prediction type (L0 prediction, L1 prediction, Bi prediction, etc.) information. In the case of applying the inter-prediction, the neighboring block may include a spatial neighboring block which is present in the current picture and a temporal neighboring block which is present in the reference picture. A reference picture including the reference block and a reference picture including the temporal neighboring block may be the same as each other or different from each other. The temporal neighboring block may be referred to as a name such as a collocated reference block, a collocated CU (colCU), etc., and the reference picture including the temporal neighboring block may be referred to as a collocated picture (colPic). For example, a motion information candidate list may be configured based on the neighboring blocks of the current block and a flag or index information indicating which candidate is selected (used) may be signaled in order to derive the motion vector and./or reference picture index of the current block. The inter-prediction may be performed based on various prediction modes and for example, in the case of a skip mode and a merge mode, the motion information of the current block may be the same as the motion information of the selected neighboring block. In the case of the skip mode, the residual signal may not be transmitted unlike the merge mode. In the case of a motion vector prediction (MVP) mode, the motion vector of the selected neighboring block may be used as a motion vector predictor and a motion vector difference may be signaled. In this case, the motion vector of the current block may be derived by using a sum of the motion vector predictor and the motion vector difference.

The motion information may further include L0 motion information and/or L1 motion information according to the inter-prediction type (L0 prediction, L1 prediction, Bi prediction, etc.). A L0-direction motion vector may be referred to as an L0 motion vector or MVL0 and an L1-direction motion vector may be referred to as an L1 motion vector or MVL1. A prediction based on the L0 motion vector may be referred to as an L0 prediction, a prediction based on the L1 motion vector may be referred to as an L1 prediction, and a prediction based on both the L0 motion vector and the L1 motion vector may be referred to as a bi-prediction. Here, the L0 motion vector may indicate a motion vector associated with a reference picture list L0 and the L1 motion vector may indicate a motion vector associated with a reference picture list L1. The reference picture list L0 may include pictures prior to the current picture in an output order and the reference picture list L1 may include pictures subsequent to the current picture in the output order, as the reference pictures. The prior pictures may be referred to as a forward (reference) picture and the subsequent pictures may be referred to as a reverse (reference) picture. The reference picture list L0 may further include the pictures subsequent to the current picture in the output order as the reference pictures. In this case, the prior pictures may be first indexed in the reference picture list L0 and the subsequent pictures may then be indexed. The reference picture list L1 may further include the pictures prior to the current picture in the output order as the reference pictures. In this case, the subsequent pictures may be first indexed in the reference picture list L1 and the prior pictures may then be indexed. Here, the output order may correspond to a picture order count (POC) order.

Further, various inter-prediction modes may be used for the prediction of the current block in the picture. For example, various modes, such as a merge mode, a skip mode, a motion vector prediction (MVP) mode, an affine mode, a subblock merge mode, a merge with MVD (MMVD) mode, and a historical motion vector prediction (HMVP) mode may be used. A decoder side motion vector refinement (DMVR) mode, an adaptive motion vector resolution (AMVR) mode, a bi-prediction with CU-level weight (BCW), a bi-directional optical flow (BDOF), and the like may be further used as additional modes. The affine mode may also be referred to as an affine motion prediction mode. The MVP mode may also be referred to as an advanced motion vector prediction (AMVP) mode. In the present document, some modes and/or motion information candidates derived by some modes may also be included in one of motion information-related candidates in other modes. For example, the HMVP candidate may be added to the merge candidate of the merge/skip modes, or also be added to an mvp candidate of the MVP mode. If the HMVP candidate is used as the motion information candidate of the merge mode or the skip mode, the HMVP candidate may be referred to as the HMVP merge candidate.

The prediction mode information indicating the inter-prediction mode of the current block may be signaled from the encoding apparatus to the decoding apparatus. In this case, the prediction mode information may be included in the bitstream and received by the decoding apparatus. The prediction mode information may include index information indicating one of multiple candidate modes. Alternatively, the inter-prediction mode may be indicated through a hierarchical signaling of flag information. In this case, the prediction mode information may include one or more flags. For example, whether to apply the skip mode may be indicated by signaling a skip flag, whether to apply the merge mode may be indicated by signaling a merge flag when the skip mode is not applied, and it is indicated that the MVP mode is applied or a flag for additional distinguishing may be further signaled when the merge mode is not applied. The affine mode may be signaled as an independent mode or signaled as a dependent mode on the merge mode or the MVP mode. For example, the affine mode may include an affine merge mode and an affine MVP mode.

Further, as described above, inter-prediction may be performed using motion information of the current block. The encoding device may derive optimal motion information for the current block through a motion estimation procedure. For example, the encoding device may search a similar reference block having a high correlation in units of a fractional pixel within a predetermined search range in the reference picture by using an original block in an original picture for the current block and derive the motion information through the searched reference block. The similarity of the block may be derived based on a difference of phase based sample values. For example, the similarity of the block may be calculated based on a sum of absolute differences (SAD) between the current block (or a template of the current block) and the reference block (or the template of the reference block). In this case, the motion information may be derived based on a reference block having a smallest SAD in a search area. The derived motion information may be signaled to the decoding device according to various methods based on the inter-prediction mode.

A predicted block for the current block may be derived based on the motion information derived according to the inter-prediction mode. The predicted block may include predicted samples (predicted sample array) of the current block. When the motion vector (MV) of the current block indicates a fractional sample unit, an interpolation procedure may be performed and the predicted samples of the current block may be derived based on reference samples of the fractional sample unit in the reference picture through the interpolation procedure. When the affine inter-prediction is applied to the current block, the predicted samples may be generated based on a sample/subblock-unit MV. When the bi-prediction is applied, predicted samples derived through a weighted sum or a weighted average of predicted samples derived based on the L0 prediction (i.e., a prediction using a reference picture in the reference picture list L0 and MVL0) and predicted samples (according to a phase) derived based on the L1 prediction (i.e., a prediction using a reference picture in the reference picture list L1 and MVL1) may be used as the predicted samples of the current block. When the bi-prediction is applied, if the reference picture used for the L0 prediction and the reference picture used for the L1 prediction are located in different temporal directions based on the current picture (i.e., if the prediction corresponds to the bi-prediction and the bi-directional prediction), this may be referred to as a true bi-prediction.

Reconstruction samples and reconstruction pictures may be generated based on the derived predicted samples and thereafter, the procedure such as in-loop filtering, etc., may be performed as described above.

Figure 4:
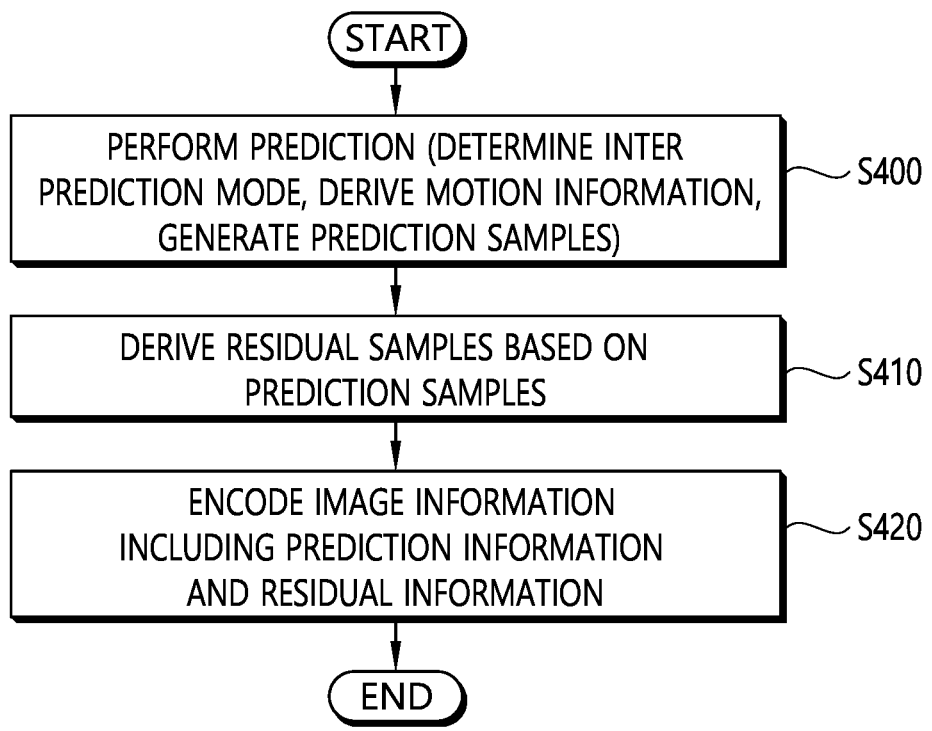
FIG. 4 illustrates an example of a video/image encoding method based on inter-prediction, and FIG. 5 schematically illustrates an example of an inter-prediction unit in an encoding apparatus.
Figure 5:
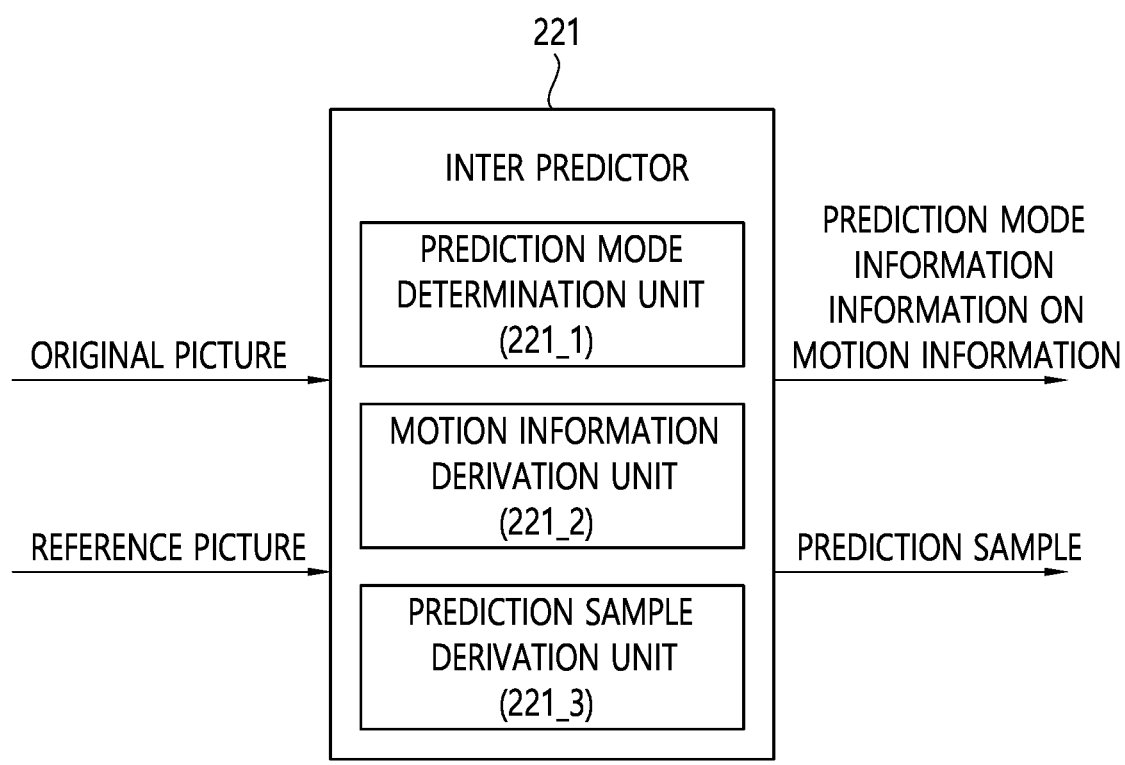

FIG. 4 illustrates one example of a video/image encoding method based on an inter-prediction and FIG. 5 illustrates one example schematically illustrating an inter-prediction unit in an encoding apparatus. The inter-prediction unit in the encoding apparatus of FIG. 5 may also be applied to be the same as or correspond to the inter-prediction unit 221 of the encoding apparatus 200 of FIG. 2.

Referring to the FIGS. 4 and 5, the encoding apparatus performs the inter-prediction for the current block (S400). The encoding apparatus may derive the inter-prediction mode and the motion information of the current block and generate the predicted samples of the current block. Here, an inter-prediction mode determining procedure, a motion information deriving procedure, and a generation procedure of the predicted samples may be simultaneously performed and any one procedure may be performed earlier than other procedures.

For example, the inter-prediction unit 221 of the encoding apparatus may include a prediction mode determination unit 221_1, a motion information derivation unit 221_2, and a predicted sample derivation unit 221_3, and the prediction mode determination unit 221_1 may determine the prediction mode for the current block, the motion information derivation unit 221_2 may derive the motion information of the current block, and the predicted sample derivation unit 221_3 may derive the predicted samples of the current block. For example, the inter-prediction unit 221 of the encoding apparatus may search a block similar to the current block in a predetermined area (search area) of reference pictures through motion estimation and derive a reference block in which a difference from the current block is minimum or is equal to or less than a predetermined criterion. A reference picture index indicating a reference picture at which the reference block is positioned may be derived based thereon and a motion vector may be derived based on a difference in location between the reference block and the current block. The encoding apparatus may determine a mode applied to the current block among various prediction modes. The encoding apparatus may compare RD cost for the various prediction modes and determine an optimal prediction mode for the current block.

For example, when the skip mode or the merge mode is applied to the current block, the encoding device may configure a merging candidate list to be described below and derive a reference block in which a difference from the current block is minimum or is equal to or less than a predetermined criterion among reference blocks indicated by merge candidates included in the merging candidate list. In this case, a merge candidate associated with the derived reference block may be selected and merge index information indicating the selected merge candidate may be generated and signaled to the decoding device. The motion information of the current block may be derived by using the motion information of the selected merge candidate.

As another example, when an (A)MVP mode is applied to the current block, the encoding device may configure an (A)MVP candidate list and use a motion vector of a selected mvp candidate among motion vector predictor (mvp) candidates included in the (A)MVP candidate list as the mvp of the current block. In this case, for example, the motion vector indicating the reference block derived by the motion estimation may be used as the motion vector of the current block and an mvp candidate having a motion vector with a smallest difference from the motion vector of the current block among the mvp candidates may become the selected mvp candidate. A motion vector difference (MVD) which is a difference obtained by subtracting the mvp from the motion vector of the current block may be derived. In this case, the information on the MVD may be signaled to the decoding apparatus. Further, when the (A)MVP mode is applied, the value of the reference picture index may be configured as reference picture index information and separately signaled to the decoding apparatus.

The encoding apparatus may derive the residual samples based on the predicted samples (S410). The encoding apparatus may derive the residual samples by comparing original samples and the predicted samples of the current block.

The encoding apparatus encodes image information including prediction information and residual information (S420). The encoding apparatus may output the encoded image information in the form of a bitstream. The prediction information may include information on prediction mode information (e.g., skip flag, merge flag or mode index, etc.) and information on motion information as information related to the prediction procedure. The information on the motion information may include candidate selection information (e.g., merge index, mvp flag or mvp index) which is information for deriving the motion vector. Further, the information on the motion information may include the information on the MVD and/or the reference picture index information. Further, the information on the motion information may include information indicating whether to apply the L0 prediction, the L1 prediction, or the bi-prediction. The residual information is information on the residual samples. The residual information may include information on quantized transform coefficients for the residual samples.

An output bitstream may be stored in a (digital) storage medium and transferred to the decoding device or transferred to the decoding device via the network.

Meanwhile, as described above, the encoding device may generate a reconstructed picture (including reconstructed samples and reconstructed blocks) based on the reference samples and the residual samples. This is to derive the same prediction result as that performed by the decoding device, and as a result, coding efficiency may be increased. Accordingly, the encoding apparatus may store the reconstruction picture (or reconstruction samples or reconstruction blocks) in the memory and utilize the reconstruction picture as the reference picture. The in-loop filtering procedure may be further applied to the reconstruction picture as described above.

Figure 6:
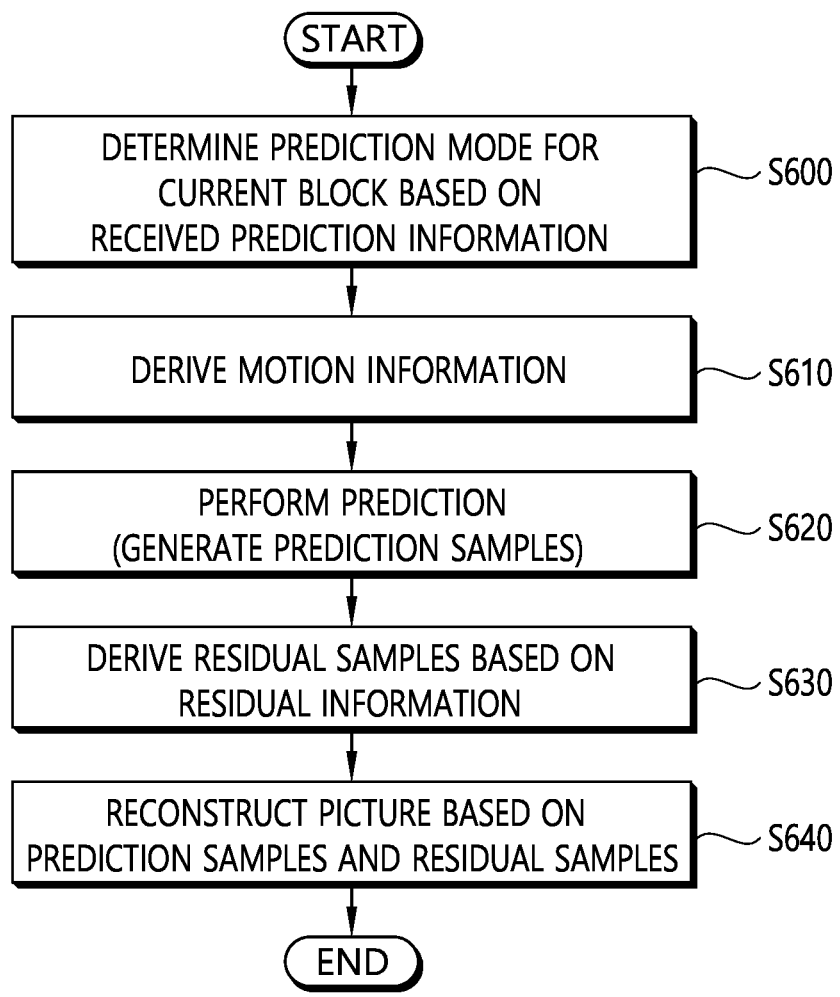
FIG. 6 illustrates an example of a video/image decoding method based on inter-prediction and FIG. 7 schematically illustrates an example of an inter-prediction unit in a decoding apparatus.
Figure 7:
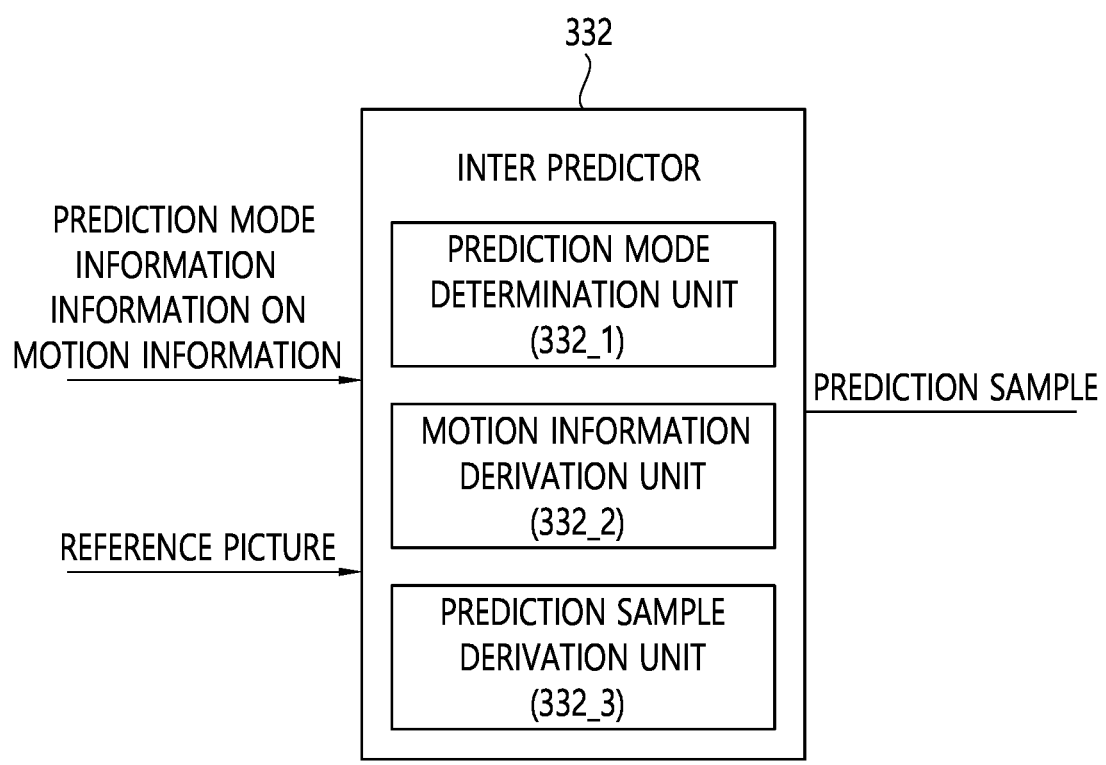

FIG. 6 illustrates one example of a video/image decoding method based on an inter-prediction and FIG. 7 illustrates one example schematically illustrating an inter-prediction unit in a decoding apparatus. The inter-prediction unit in the decoding apparatus of FIG. 7 may also be applied to be the same as or correspond to the inter-prediction unit 332 of the decoding apparatus 300 of FIG. 3.

Referring to FIGS. 6 and 7, the decoding apparatus may perform an operation corresponding to the operation performed by the encoding apparatus. The decoding apparatus may perform the prediction for the current block based on received prediction information and derive the predicted samples.

Specifically, the decoding apparatus may determine the prediction mode for the current block based on the received prediction information (S600). The decoding apparatus may determine which inter-prediction mode is applied to the current block based on the prediction mode information in the prediction information.

For example, it may be determined whether the merge mode or the (A)MVP mode is applied to the current block based on the merge flag. Alternatively, one of various inter-prediction mode candidates may be selected based on the mode index. The inter-prediction mode candidates may include a skip mode, a merge mode, and/or an (A)MVP mode or may include various inter-prediction modes described above.

The decoding apparatus derives the motion information of the current block based on the determined inter-prediction mode (S610). For example, when the skip mode or the merge mode is applied to the current block, the decoding device may configure the merge candidate list and select one merge candidate among the merge candidates included in the merge candidate list. Here, the selection may be performed based on the selection information (merge index). The motion information of the current block may be derived by using the motion information of the selected merge candidate. The motion information of the selected merge candidate may be used as the motion information of the current block.

As another example, when an (A)MVP mode is applied to the current block, the decoding apparatus may configure an (A)MVP candidate list and use a motion vector of a selected mvp candidate among motion vector predictor (mvp) candidates included in the (A)MVP candidate list as the mvp of the current block. Here, the selection may be performed based on the selection information (mvp flag or mvp index). In this case, the MVD of the current block may be derived based on the information on the MVD, and the motion vector of the current block may be derived based on the mvp of the current block and the MVD. Further, the reference picture index of the current block may be derived based on the reference picture index information. The picture indicated by the reference picture index in the reference picture list for the current block may be derived as the reference picture referred for the inter-prediction of the current block.

Meanwhile, the motion information of the current block may be derived without a candidate list configuration and in this case, the motion information of the current block may be derived according to a procedure disclosed in the prediction mode. In this case, the candidate list configuration may be omitted.

The decoding apparatus may generate the predicted samples for the current block based on the motion information of the current block (S620). In this case, the reference picture may be derived based on the reference picture index of the current block and the predicted samples of the current block may be derived by using the samples of the reference block indicated by the motion vector of the current block on the reference picture. In this case, in some cases, a predicted sample filtering procedure for all or some of the predicted samples of the current block may be further performed.

For example, the inter-prediction unit 332 of the decoding apparatus may include a prediction mode determination unit 332_1, a motion information derivation unit 332_2, and a predicted sample derivation unit 332_3, and the prediction mode determination unit 332_1 may determine the prediction mode for the current block based on the received prediction mode information, the motion information derivation unit 332_2 may derive the motion information (the motion vector and/or reference picture index) of the current block based on the information on the received motion information, and the predicted sample derivation unit 332_3 may derive the predicted samples of the current block.

The decoding apparatus generates the residual samples for the current block based on the received residual information (S630). The decoding apparatus may generate the reconstruction samples for the current block based on the predicted samples and the residual samples and generate the reconstruction picture based on the generated reconstruction samples (S640). Thereafter, the in-loop filtering procedure may be further applied to the reconstruction picture as described above.

As described above, the inter-prediction procedure may include an inter-prediction mode determining step, a motion information deriving step depending on the determined prediction mode, and a prediction performing (predicted sample generating) step based on the derived motion information. The inter-prediction procedure may be performed by the encoding apparatus and the decoding apparatus as described above.

Meanwhile, when inter-prediction is performed on a current block, the merge mode may be applied. In the merge mode, motion information of a current predicted block is not directly transmitted and is derived using motion information of neighboring predicted blocks. Accordingly, the motion information of the current predicted block may be indicated by transmitting flag information representing that the merge mode has been used and a merge index indicating a used neighboring predicted block. The merge mode may also be called a regular merge mode. For example, the merge mode may be applied when regular_merge_flag is equal to 1.

An encoder needs to search merge candidate blocks used to derive the motion information of the current predicted block in order to perfrom the merge mode. For example, although a maximum of five merge candidate blocks may be used, the embodiments of the present disclosure are not limited thereto. In addition, a maximum number of merge candidate blocks may be transmitted through a slice header or a tile group header, but the embodiments of the present disclosure are not limited thereto. After searching the merge candidate blocks, the encoder may generate a merge candidate list and select a merge candidate block having the lowest cost from the merge candidate blocks as a final merge candidate block.

The present disclosure provides various embodiments with respect to merge candidate blocks configuring a merge candidate list. The merge candidate list may include, for example, five merge candidate blocks. For example, the merge candidate list may include four spatial merge candidates and one temporal merge candidate. As a specific example, spatial merge candidates illustrated in FIG. 8 may be used as spatial merge candidates. Hereinafter, a spatial merge candidate or a spatial MVP candidate may be called SMVP and a temporal merge candidate or a temporal MVP candidate may be called TMVP.

Figure 8:
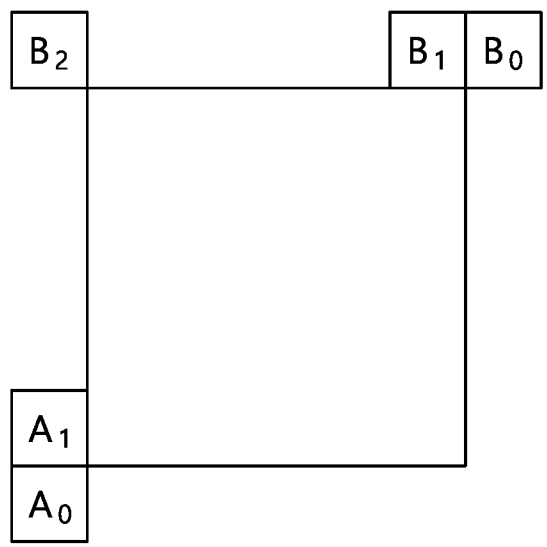
FIG. 8 illustrates spatial neighboring blocks that can be used as spatial merge candidates.

FIG. 8 illustrates spatial neighboring blocks that can be used as spatial merge candidates.

Referring to FIG. 8, the spatial neighboring blocks may include at least one of a bottom left neighboring block A0, a left neighboring block A1, a top right neighboring block B0, a top neighboring block B1, and a top left neighboring block B2 of a current block in the merge mode. The spatial neighboring blocks may further include neighboring blocks in addition to the neighboring blocks illustrated in FIG. 8 or may not include a specific neighboring block of the neighboring blocks illustrated in FIG. 8 according to circumstances. Further, the spatial neighboring blocks may include only a specific neighboring block, for example, the left neighboring block A1 of the current block.

When the merge mode is applied, the encoding apparatus/decoding apparatus may detect available spatial neighboring blocks while searching spatial neighboring blocks in predetermined search order in configuration of spatial merge candidates.

Here, availability of a spatial neighboring block may be determined by reference picture information, prediction mode information, and position information of the spatial neighboring block. For example, if a reference picture of a spatial neighboring block and a reference picture of the current block are identical, this spatial neighboring block may be determined to be available. If a spatial neighboring block is coded in the intra-prediction mode, a prediction mode of the spatial neighboring block differs from a prediction mode of the current block, or the spatial neighboring block is positioned outside a current picture/tile, this spatial neighboring block may be determined to be unavailable.

In addition, the spatial neighboring block search order may be defined in various manners, for example, in the order of A1, B1, B0, A0, and B2. Further, it is possible to search for only A1 to determine whether A1 is available.

Figure 9:
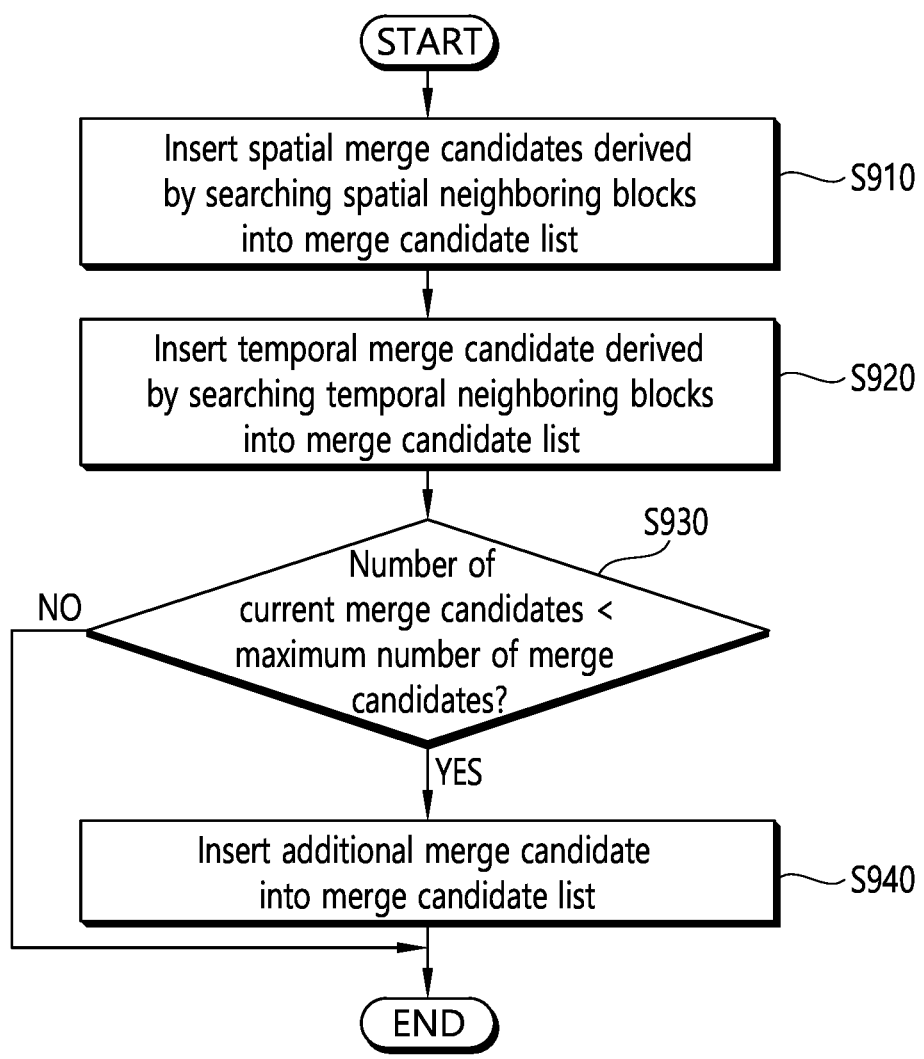
FIG. 9 schematically illustrates an example of a method of configuring a merge candidate list for a current block.

FIG. 9 schematically illustrates an example of a method of configuring a merge candidate list for the current block.

Referring to FIG. 9, a coding apparatus (encoder/decoder) inserts spatial merge candidates derived by searching spatial neighboring blocks of the current block to a merge candidate list (S910).

For example, spatial neighboring blocks may include a bottom left neighboring block, a left neighboring block, a top right neighboring block, a top neighboring block, and a top left neighboring block of the current block. However, this is an example and additional neighboring blocks such as a right neighboring block, a bottom neighboring block, and a bottom right neighboring block may be used as the spatial neighboring blocks in addition to the aforementioned spatial neighboring blocks. The coding apparatus may search spatial neighboring blocks based on priority to detect available blocks and derive motion information of the detected blocks as spatial merge candidates. For example, the encoder and the decoder may sequentially search the five blocks illustrated in FIG. 8 in the order of A1, B1, B0, A0, and B2 and sequentially index available candidates to configure a merge candidate list.

The coding apparatus inserts temporal merge candidates derived by searching temporal neighboring blocks of the current block into the merge candidate list (S920).

Temporal neighboring blocks may be positioned in a reference picture different from a current picture. The reference picture in which the temporal neighboring blocks are positioned may be called a collocated picture or col picture. The temporal neighboring blocks may be searched in the order of a bottom right neighboring block and a bottom right center block of a co-located block corresponding to the current block in the col picture.

When motion data compression is applied, specific motion information may be stored as a representative motion information per storage unit in a col picture. In this case, it is not necessary to store motion information about all blocks in a certain storage unit, and thus motion data compression effect can be obtained. In this case, the certain storage unit may be predetermined to be a 16×16 sample unit, an 8×8 sample unit, or the like, for example, or the encoder may signal size information about the certain storage unit to the decoder. When motion data compression is applied, motion information of a temporal neighboring block may be replaced with representative motion information of a certain storage unit in which the temporal neighboring block is positioned. That is, in terms of implementation, a temporal merge candidate may be derived based on motion information of a predicted block that covers arithmetic left shifted position after arithmetic right shift by a predetermined value based on the coordinates (top left sample position) of the temporal neighboring block, instead of a predicted block positioned at the coordinates of the temporal neighboring block. For example, if the coordinates of the temporal neighboring block are (xTnb, yTnb) when the certain storage unit is a 2n×2n sample unit, motion information of a predicted block positioned at a corrected position ((xTnb»n)«n), (yTnb»n)«n)) may be used for a temporal merge candidate. Specifically, for example, if the coordinates of the temporal neighboring block are (xTnb, yTnb) when the certain storage unit is a 16×16 sample unit, motion information of a predicted block positioned at a corrected position ((xTnb»4)«4), (yTnb»4)«4)) may be used for a temporal merge candidate. Further, for example, if the coordinates of the temporal neighboring block are (xTnb, yTnb) when the certain storage unit is an 8×8 sample unit, motion information of a predicted block positioned at a corrected position ((xTnb»3)«3), (yTnb»3)«3)) may be used for a temporal merge candidate.

The coding apparatus may check whether the number of current merge candidates is less than a maximum number of merge candidates (S930).

The maximum number of merge candidates may be predefined or signaled by the encoder to the decoder. For example, the encoder may generate information on the maximum number of merge candidates, encode the information, and transmit the encoded information in the form of a bitstream to the decoder. Upon reaching the maximum number of merge candidates, a subsequent process of adding candidates may not be performed.

If the number of current merge candidates is less than the maximum number of merge candidates as a result of the aforementioned checking step, the coding apparatus inserts additional merge candidates into the merge candidate list (S940).

For example, the additional merge candidates may include at least one of history based merge candidate(s), pair-wise average merge candidate(s), ATMVP, combined bi-predictive merge candidate(s) (when the slice/tile group type of the current slice/tile group is B type), and/or zero vector merge candidate(s).

If the number of current merge candidates is not less than the maximum number of merge candidates as a result of the aforementioned checking step, the coding apparatus may end configuration of the merge candidate list. In this case, the encoder may select optimal merge candidates from merge candidates constituting the merge candidate list based on rate-distortion (RD) cost and signal selection information (e.g., merge index) indicating the selected merge candidates to the decoder. The decoder may select an optimal merge candidate based on the merge candidate list and the selection information.

Motion information of the selected merge candidate may be used as motion information of the current block and predicted samples of the current block may be derived based on the motion information of the current block, as described above. The encoder may derive residual samples of the current block based on the predicted samples and signal residual information about the residual samples to the decoder. The decoder may generate reconstructed samples based on residual samples derived based on the residual information and predicted samples and generate a reconstructed picture based on the reconstructed samples, as described above.

When the skip mode is applied, motion information of the current block may be derived using the same method as the above-described method used when the merge mode is applied. However, when the skip mode is applied, a residual signal for the corresponding block is omitted and thus predicted samples may be directly used as reconstructed samples. The skip mode may be applied, for example, when cu_skip_flag is set to 1.

Meanwhile, the prediction for the current block may be performed based on an intra block copy (IBC) prediction mode. The IBC prediction mode may be used for a content image/video coding of a game or the like, such as a screen content coding (SCC). The IBC basically performs the prediction in the current picture but may be performed similarly to the inter-prediction in that the reference block is derived in the current picture. In other words, the IBC may use at least one of the inter-prediction techniques described in the present document.

For example, the IBC may use at least one of the aforementioned methods for deriving the motion information (motion vector). At least one of the inter-prediction techniques may be also partially modified and used in consideration of the IBC prediction as described later. The IBC may refer to the current picture, and thus also be referred to as a current picture referencing (CPR). For example, whether the IBC is applied to the current block may be indicated based on an IBC flag (e.g., pred_mode_ibc_flag). The IBC flag (e.g., pred_mode_ibc_flag) may be coded as a syntax element and generated in the form of a bitstream, and signaled from the encoding apparatus to the decoding apparatus through the bitstream.

For the IBC prediction, the encoding apparatus may derive an optimal block vector (or motion vector) for the current block (e.g., CU) by performing a block matching (BM). The derived block vector (or motion vector) may be signaled to the decoding apparatus through the bitstream using a method similar to the aforementioned signaling of the motion information (motion vector) in the inter-prediction. The decoding apparatus may derive the reference block for the current block in the current picture through the signaled block vector (motion vector), thereby deriving a prediction signal (predicted block or predicted samples) for the current block. Here, the block vector may correspond to the aforementioned motion vector, and represent displacement from the current block to the reference block positioned in an already reconstructed area in the current picture. Therefore, the block vector (or motion vector) may also be referred to as a displacement vector. The motion vector in the IBC may correspond to the block vector or the displacement vector. Further, the MVD in the IBC may be referred to as a block vector difference (BVD). The motion vector of the current block may include a motion vector for a luma component (luma motion vector) or a motion vector for a chroma component (chroma motion vector). For example, the luma motion vector for the IBC-coded CU may be an integer sample unit (i.e., integer precision). The chroma motion vector may also be clipped in the integer sample unit. As described above, the IBC may use at least one of the inter-prediction techniques, and for example, if the IBC is applied like the AMVR, a 1-pa or 4-pa motion vector precision may be switched.

At the CU level, the IBC prediction mode may be signaled through the flag, and signaled to the IBC (A)MVP mode or the IBC skip/merge mode.

For example, in the IBC skip/merge mode, the block vector of the current block may be derived using a merge candidate index. Here, the merge candidate index may indicate which block vector among the block vectors in the list constituted based on the IBC mode-coded neighboring candidate blocks is used to predict the current block. The merge candidate list may be configured to include the spatial candidate, the historical motion vector prediction (HMVP) candidate, and a pairwise candidate.

In the IBC (A)MVP mode, the block vector difference (BVD) may be coded in the same manner as that in the MVD. The block vector prediction method may use two candidates as a predictor, and the two candidates may be derived from a (IBC mode-coded) left neighboring block and a (IBC mode-coded) top neighboring block. At this time, if the left neighboring block or the top neighboring block is not available, the default block vector may be used as the predictor. The flag may be signaled as index information for indicating the block vector predictor.

Meanwhile, at least one of the inter-prediction techniques may be used for IBC prediction, as described above. For example, it is possible to signal whether IBC is available through a sequence parameter set (SPS) syntax according to IBC prediction. Here, if it is signaled that IBC is available through the SPS syntax, I slice may be processed like P slice and thus inter-prediction coding (e.g., merge mode, (A)MVP mode) may be applied. Here, I slice (intra slice) may mean a slice coded using only intra-prediction. P slice (prediction slice) may mean a slice coded using intra-prediction or inter-prediction and, particularly, a slice coded based on inter-prediction using a single motion vector and reference picture index.

However, in current IBC prediction, it is signaled that the current IBC mode does not allow inter-prediction coding even if IBC does not operate simultaneously with inter-prediction coding. For example, syntaxes related to inter-prediction such as a MMVD (merge with MVD) mode, an affine mode, a multi-hypothesis mode, and a tri-angular mode are signaled including information for instructing the corresponding inter-prediction coding not to operate.

However, to maximize the performance for complexity, MMVD among inter-prediction techniques may be applied in a process of performing IBC prediction. Accordingly, the present disclosure proposes a method for simultaneously applying IBC prediction and MMVD. Particularly, the present disclosure proposes a method for applying MMVD in the case of current picture referencing (CPR) in a process of coding a current block.

The MMVD mode is a method of applying a motion vector difference (MVD) to the merge mode, and motion information directly used to generate predicted samples of the current block (i.e., current CU) may be implicitly derived. For example, an MMVD flag (e.g., mmvd_flag) indicating whether to use MMVD for the current block (i.e., current CU) may be signaled, and MMVD may be performed based on the MMVD flag. When MMVD is applied to the current block (e.g., when mmvd_flag is equal to 1), additional information on MMVD may be signaled.

Here, the additional information on MMVD may include a merge candidate flag (e.g., mmvd_cand_flag) indicating whether a first candidate or a second candidate in the merge candidate list is used along with MVD, a distance index (e.g., mmvd_distance_idx) indicating a motion magnitude, and a direction index (e.g., mmvd_direction jdx) indicating a motion direction.

Two candidates (i.e., the first candidate and the second candidate) corresponding to first and second entries from among candidates in the merge candidate list may be used in the MMVD mode, and one of the two candidates (i.e., the first candidate and the second candidate) may be used as a base MV. For example, the merge candidate flag (e.g., mmvd_cand_flag) may be signaled in order to indicate one of the two candidates (i.e., the first candidate and the second candidate) in the merge candidate list.

In addition, the distance index (e.g., mmvd_distance_idx) indicates motion magnitude information and may indicate a predetermined offset from a start point. This offset may be added to a horizontal component or a vertical component of a start motion vector. The relationship between the distance index and the predetermined offset is shown in Table 1.

TABLE 1

| | MmvdDistance[ x0 ][ y0 ] | |
|---|---|---|
| mmvd_distance_idx[ x0 ][ y0 ] | slice_fpel_mmvd_enabled_flag == 0 | slice_fpel_mmvd_enabled_flag == 1 |
| 0 | 1 | 4 |
| 1 | 2 | 8 |
| 2 | 4 | 16 |
| 3 | 8 | 32 |
| 4 | 16 | 64 |
| 5 | 32 | 128 |
| 6 | 64 | 256 |
| 7 | 128 | 512 |

Referring to Table 1, a distance of MVD (e.g., MmvdDistance) is determined according to the value of the distance index (e.g., mmvd_distance_idx), and the distance of MVD (e.g., MmvdDistance) may be derived using integer sample precision or fractional sample precision based on a value of slice_fpel_mmvd_enabled_flag. For example, it represents that the distance of MVD is derived from the current slice using integer sample precision when a value of slice_fpel_mmvd_enabled_flag is equal to 1, and it represents that the distance of MVD is derived from the current slice using the fractional sample precision when the value of slice_fpel_mmvd_enabled_flag is equal to 0.

Further, the direction index (e.g., mmvd_direction_idx) indicates a direction of MVD based on the start point and may indicate four directions as shown in Table 2. Here, a direction of MVD may indicate a sign of MVD. The relationship between direction indexes and MVD signs is shown in Table 2.

TABLE 2

| mmvd_direction_idx[ x0 ][ y0 ] | MmvdSign[ x0 ][ y0 ][0] | MmvdSign[ x0 ][ y0 ][1] |
|---|---|---|
| 0 | +1 | 0 |
| 1 | −1 | 0 |
| 2 | 0 | +1 |
| 3 | 0 | −1 |

Referring to Table 2, a sign of MVD (e.g., MmvdSign) is determined according to the value of the direction index (e.g., mmvd_direction_idx) and may be derived for L0 reference picture and L1 reference picture.

An offset of MVD may be calculated based on the aforementioned distance index (e.g., mmvd_distance jdx) and the direction index (e.g., mmvd_direction_idx) according to Equation 1.

$$MmvdOffset[x0][y0][0]=(MmvdDistance[x0][y0]\ll2)*MmvdSign[x0][y0][0]MmvdOffset[x0][y0][1]=(MmvdDistance[x0][y0]\ll2)*MmvdSign[x0][y0][1]$$ [Equation 1]

That is, in the MMVD mode, a merge candidate indicated by the merge candidate flag (e.g., mmvd_cand_flag) may be selected from merge candidates in a merge candidate list derived based on neighboring blocks and the selected merge candidate may be used as a base candidate (e.g., MVP). In addition, motion information (i.e., a motion vector) of the current block may be derived by adding MVD derived using the distance index (e.g., mmvd_distance jdx) and the direction index (e,g., mmvd_direction_idx) based on the base candidate.

Hereinafter, a method for applying MMVD from among inter-prediction techniques in a process of performing IBC prediction will be described. Particularly, a method for deriving base candidates (i.e., base motion information candidates) of MMVD in order to support application of MMVD in a process of performing CPR with reference to the current picture in a process of coding the current block is provided. By providing this method, complexity for performance can be reduced and compression performance can be improved.

As an embodiment, a case in which the current picture is referred to in a process of coding (encoding/decoding) the current picture and only one reference picture (i.e., current picture) exists in a reference picture list may be conceived. For example, the MMVD mode may be applied to the current block that is a CPR coding block. Here, a base motion information candidate may be derived based on whether a prediction candidate of the current block is a CPR coding block. If the prediction candidate is a CPR coding block, motion information of the prediction candidate may be configured as a base motion information candidate. If the prediction candidate is not a CPR coding block, a zero vector may be configured as base motion information. Alternatively, if the prediction candidate is not available and thus base motion information candidates are not fully filled, a zero vector may be configured as base motion information.

Here, a prediction candidate may mean a motion information candidate (e.g., a merge candidate) derived based on spatial/temporal neighboring blocks of the current block, as described above. In addition, a base motion information candidate may mean a motion information candidate (e.g., a merge candidate) used in the MMVD mode and may include two candidates (i.e., a candidate indexed in first order and a candidate indexed in second order) in the merge candidate list, for example.

When MMVD is applied in a process of performing CPR, a method of configuring base motion information candidates as in the above-described embodiment may be implemented according to specifications shown in Table 3.

TABLE 3

| 1.1.1.1 Derivation process for luma motion vectors for merge mode |
|---|
| This process is only invoked when merge_flag[ xCb ][ yPb ]is equal to 1, where ( xCb, yCb ) specify the top-left sample of the current luma coding block relative to the top-left luma sample of the current picture.<br>Inputs to this process are:<br>a luma location ( xCb, yCb ) of the top-left sample of the current luma coding block relative to the top-left luma sample of the current picture,<br>a variable cbWidth specifying the width of the current coding block in luma samples,<br>a variable cbHeight specifying the height of the current coding block in luma samples.<br>Outputs of this process are:<br>the luma motion vectors in 1/16 fractional-sample accuracy mvL0[ 0][ 0 ] and mvL1[ 0 ][ 0 ],<br>the reference indices refIdxL0 and refIdxL1,<br>the prediction list utilization flags predFlagL0[ 0 ][ 0] and predFlagL1[ 0 ][ 0 ],<br>the bi-prediction weight index gbiIdx.<br>The bi-prediction weight index gbiIdx is set equal to 0.<br>The motion vectors mvL0[ 0 ][ 0 ] and mvL1[ 0][ 0 ], the reference indices refIdxL0 and refIdxL1 and the prediction utilization flags predFlagL0[ 0 ][ 0 ]and predFlagL1[ 0 ][ 0 ] are derived by the following ordered steps:<br>   1.   The derivation process for merging candidates from neighbouring coding units as specified in clause 8.3.2.3 is invoked with the luma coding block location ( xCb, yCb ), the luma coding block width cbWidth, and the luma coding block height cbHeight as inputs, and the output being the availability flags availableFlag$A_0$, availableFlag$A_1$, availableFlag$B_0$, availableFlag$B_1$ and availableFlag$B_2$, the reference indices refIdxLX$A_0$, refIdxLX$A_1$, refIdxLX$B_0$, refIdxLX$B_1$, and refIdxLX$B_2$, the prediction list utilization flagspredFlagLX$A_0$, predFlagLX$A_1$, predFlagLX$B_0$, predFlagLX$B_1$ and predFlagLX$B_2$,and the motion vectors mvLX$A_0$, mvLX$A_1$, mvLX$B_0$, mvLX$B_1$ and mvLX$B_2$, with X being 0 or 1, and the bi-prediction<br>      weight indices gbiIdx$A_0$, gbiIdx$A_1$, gbiIdx$B_0$, gbiIdx$B_1$,gbiIdx$B_2$. |

TABLE 3-continued 1.1.1.1 Derivation process for luma motion vectors for merge mode 2. The reference indices, refIdxLXCol, with X being 0 or 1, and thebi-prediction weight index gbiIdxCol for the temporal merging candidate Col are set equal to 0.
3. The derivation process for temporal luma motion vector prediction asspecified in in clause 8.3.2.11 is invoked with the luma location ( xCb, yCb ), the lumacoding block width cbWidth, the luma coding block height cbHeight and the variable refIdxL0Col as inputs, and the output being the availability flag availableFlagL0Col and thetemporal motion vector mvL0Col. The variables availableFlagCol, predFlagL0Col andpredFlagL1Col are derived as follows:
availableFlagCol = availableFlagL0Col (8-196)
predFlagL0Col = availableFlagL0Col (8-197)
predFlagL1Col = 0 (8-198)
4. When slice_type is equal to B, the derivation process for temporal luma motion vector prediction as specified in clause 8.3.2.11 is invoked with the luma location( xCb, yCb ), the luma coding block width cbWidth, the luma coding block height cbHeight and the variable refIdxL1Col as inputs, and the output being the availability flag availableFlagL1Col and the temporal motion vector mvL1Col. The variables availableFlagColand predFlagL1Col are derived as follows:
availableFlagCol = availableFlagL0Col || availableFlagL1Col (8-199)
predFlagL1Col = availableFlagL1Col (8-200)
5. The merging candidate list, mergeCandList, is constructed asfollows:
i = 0
if( availableFlag$A_1$ )
mergeCandList[ i++ ] = $A_1$
if( availableFlag$B_1$ )
mergeCandList[ i++ ] = $B_1$
if( availableFlag$B_0$ )
mergeCandList[ i++] = $B_0$ (8-201)
if( availableFlag$A_0$ )
mergeCandList[ i++ ] = $A_0$
if( availableFlag$B_2$ )
mergeCandList[ i++ ] = $B_2$
if( availableFlagCol )
mergeCandList[ i++ ] = Col
6. The variable numCurrMergeCand and numOrigMergeCand are set equal to the number of merging candidates in the mergeCandList.
7. When numCurrMergeCand is less than (MaxNumMergeCand − 1) and NumHmvpCand is greater than 0, the following applies:
The derivation process of history-based merging candidates as specified in 8.3.2.6 is invoked with mergeCandList, and numCurrMergeCand as inputs, andmodified mergeCandList and numCurrMergeCand as outputs.
numOrigMergeCand is set equal to numCurrMergeCand.
8. The derivation process for pairwise average merging candidates specifiedin clause 8.3.2.4 is invoked with mergeCandList, the reference indices refIdxL0N and refIdxL1N, the prediction list utilization flags predFlagL0N and predFlagL1N, the motionvectors mvL0N and mvL1N of every candidate N in mergeCandList, numCurrMergeCand and numOrigMergeCand as inputs, and the output is assigned to mergeCandList, numCurrMergeCand, the reference indices refIdxL0avgCand$_k$ and refIdxL1avgCand$_k$, the prediction list utilization flags predFlagL0avgCand$_k$ and predFlagL1avgCand$_k$ and the motion vectors mvL0avgCand$_k$ andmvL1avgCand$_k$ of every new candidate avgCand$_k$ being added into mergeCandList. The bi-prediction weight index gbiIdx of every new candidate avgCand$_k$ being added intomergeCandList is set equal to 0. The number of candidates being added, numAvgMergeCand, is set equal to
( numCurrMergeCand − numOrigMergeCand ). When numAvgMergeCand isgreater than 0, k ranges from 0 to numAvgMergeCand − 1, inclusive.
9. The derivation process for zero motion vector merging candidates specified in clause 8.3.2.5 is invoked with the mergeCandList, the reference indicesrefIdxL0N and refIdxL1N, the prediction list utilization flags predFlagL0N and predFlagL1N,the motion vectors mvL0N and mvL1N of every candidate N in mergeCandList and numCurrMergeCand as inputs, and the output is assigned tomergeCandList, numCurrMergeCand, the reference indices refIdxL0zeroCand$_m$ and refIdxL1zeroCand$_m$, the prediction list utilization flags predFlagL0zeroCand$_m$ and predFlagL1zeroCand$_m$ and the motion vectors mvL0zeroCand$_m$ andmvL1zeroCand$_m$ of every new candidate zeroCand$_m$ being added into mergeCandList. The bi-prediction weight index gbiIdx of every new candidate zeroCand$_m$ being added intomergeCandList is set equal to 0. The number of candidates being added, numZeroMergeCand, is set equal to
( numCurrMergeCand numOrigMergeCand numAvgMergeCand ). When numZeroMergeCand is greater than 0, m ranges from 0 to numZeroMergeCand− 1, inclusive.
10. If mmvd_flag[ xCb ][ yCb ] is equal to 1, thevariable mmvdCnt is set to 0. The following applies until mmvdCnt is greater than merge_idx[ xCb ][ yCb] or mmvdCnt is equal to MaxNumMergeCand:
mmvdCnt++;
11. The following assignments are made with N being the candidate atposition merge_idx[ xCb ][ yCb ] in the merging candidate list mergeCandList
( N = mergeCandList[ merge_idx[ xCb ][ yCb ]] ) and X being replaced by 0 or 1:
refIdxLX = refIdxLXN (8-202)
predFlagLX[ 0 ][ 0 ] = predFlagLXN (8-203)
mvLX[ 0 ][ 0 ][ 0 ] = mvLXN[ 0 ] (8-204)

TABLE 3-continued 1.1.1.1 Derivation process for luma motion vectors for merge mode

| | | |
|---|---|---|
| | mvLX[ 0 ][ 0 ][ 1 ] = mvLXN[ 1 ] | (8-205) |
| | gbiIdx = gbiIdxN | (8-206) |
| 12. | When mmvd_flag[ xCb ][ yCb ] is equal to 1, thefollowing applies:<br>The derivation process for merge motion vector difference as specified in 8.3.2.7 is invoked with the luma location ( xCb, yCb ), the luma motion vectorsmvL0[ 0 ][ 0 ], mvL1[ 0 ][ 0 ], the reference indices refIdxL0, refIdxL1and the prediction list utilization flags predFlagL0[ 0 ][ 0 ] and predFlagL1[ 0][ 0 ] as inputs, and the motion vector differences mMvdL0 and mMvdL1 as outputs.<br>The motion vector difference mMvdLX is added to the merge motion vectors mvLX for X being 0 and 1 as follows: | |
| | mvLX[ 0 ][ 0 ][ 0 ] += mMvdLX[ 0] | (8-207) |
| | mvLX[ 0 ][ 0 ][ 1 ] += mMvdLX[ 1] | (8-208) |

As another embodiment, a case in which the current picture is referred to in a process of coding (encoding/decoding) the current picture and a reference picture other than the current picture exists in a reference picture list may be conceived. For example, the MMVD mode may be applied to the current block that is a CPR coding block. Here, base motion information candidates may be derived irrespective of whether a prediction candidate of the current block is a CPR coding block. Motion information of the prediction candidate may be configured as a base motion information candidate in both a case in which the prediction candidate is a CPR coding block and a case in which the prediction candidate is not a CPR coding block. In this case, if the prediction candidate is not available and thus base motion information candidates are not fully filled, a zero vector may be configured as base motion information.

Here, a prediction candidate may mean a motion information candidate (e.g., a merge candidate) derived based on spatial/temporal neighboring blocks of the current block, as described above. In addition, a base motion information candidate may mean a motion information candidate (e.g., a merge candidate) used in the MMVD mode and may include two candidates (i.e., a candidate indexed in first order and a candidate indexed in second order) in the merge candidate list, for example.

When MMVD is applied in a process of performing CPR, a method of configuring base motion information candidates as in the above-described embodiment may be implemented according to specifications shown in Table 4.

TABLE 4

1.1.1.2 Derivation process for luma motion vectors for merge mode

| |
|---|
| This process is only invoked when merge_flag[ xCb ][ yPb ] is equal to 1, where ( xCb, yCb ) specify the top-left sample of the current luma coding block relative to the top-left luma sample of the current picture.<br>Inputs to this process are:<br>a luma location ( xCb, yCb ) of the top-left sample of the current luma coding block relative to the top-left luma sample of the current picture,<br>a variable cbWidth specifying the width of the current coding block in luma samples,<br>a variable cbHeight specifying the height of the current coding block in luma samples.<br>Outputs of this process are:<br>the luma motion vectors in 1/16 fractional-sample accuracy mvL0[ 0][ 0 ] and mvL1[ 0 ][ 0 ],<br>the reference indices refIdxL0 and refIdxL1,<br>the prediction list utilization flags predFlagL0[ 0 ][ 0] and predFlagL1[ 0 ][ 0 ],<br>the bi-prediction weight index gbiIdx.<br>The bi-prediction weight index gbiIdx is set equal to 0.<br>The motion vectors mvL0[ 0 ][ 0 ] and mvL1[ 0][ 0 ], the reference indices refIdxL0 and refIdxL1 and the prediction utilization flags predFlagL0[ 0 ][ 0 ]and predFlagL1[ 0 ][ 0 ] are derived by the following ordered steps: |

| | | |
|---|---|---|
| 1. | The derivation process for merging candidates from neighbouring codingunits as specified in clause 8.3.2.3 is invoked with the luma coding block location ( xCb, yCb ), the luma coding block width cbWidth, and the luma coding block height cbHeight asinputs, and the output being the availability flags availableFlagA$_0$, availableFlagA$_1$, availableFlagB$_0$, availableFlagB$_1$ and availableFlagB$_2$, the reference indices refIdxLXA$_0$, refIdxLXA$_1$, refIdxLXB$_0$, refIdxLXB$_1$, and refIdxLXB$_2$, the prediction list utilization flagspredFlagLXA$_0$, predFlagLXA$_1$, predFlagLXB$_0$, predFlagLXB$_1$ and predFlagLXB$_2$,and the motion vectors mvLXA$_0$, mvLXA$_1$, mvLXB$_0$, mvLXB$_1$ andmvLXB$_2$, with X being 0 or 1, and the bi-prediction weight indices gbiIdxA$_0$, gbiIdxA$_1$, gbiIdxB$_0$, gbiIdxB$_1$,gbiIdxB$_2$. | |
| 2. | The reference indices, refIdxLXCol, with X being 0 or 1, and thebi-prediction weight index gbiIdxCol for the temporal merging candidate Col are set equal to 0. | |
| 3. | The derivation process for temporal luma motion vector prediction as specified in in clause 8.3.2.11 is invoked with the luma location ( xCb, yCb ), the luma coding block width cbWidth, the luma coding block height cbHeight and the variable refIdxL0Col as inputs, and the output being the availability flag availableFlagL0Col and the temporal motion vector mvL0Col. The variables availableFlagCol, predFlagL0Col andpredFlagL1Col are derived as follows: | |
| | availableFlagCol = availableFlagL0Col | (8-196) |
| | predFlagL0Col = availableFlagL0Col | (8-197) |
| | predFlagL1Col = 0 | (8-198) |

TABLE 4-continued 1.1.1.2 Derivation process for luma motion vectors for merge mode 4. When slice_type is equal to B, the derivation process for temporal luma motion vector prediction as specified in clause 8.3.2.11 is invoked with the luma location ( xCb, yCb ), the luma coding block width cbWidth, the luma coding block height cbHeight and the variable refIdxL1Col as inputs, and the output being the availability flagavailableFlagL1Col and the temporal motion vector mvL1Col. The variables availableFlagColand predFlagL1Col are derived as follows:
availableFlagCol = availableFlagL0Col || availableFlagL1Col   (8-199)
predFlagL1Col = availableFlagL1Col   (8-200)

5. The merging candidate list, mergeCandList, is constructed asfollows:
i = 0
if( availableFlag$A_1$ )
mergeCandList[ i++ ] = $A_1$
if( availableFlag$B_1$ )
mergeCandList[ i++ ] = $B_1$
if( availableFlag$B_0$ )
mergeCandList[ i++ ] = $B_0$   (8-201)
if( availableFlag$A_0$ )
mergeCandList[ i++ ] = $A_0$
if( availableFlag$B_2$ )
mergeCandList[ i++ ] = $B_2$
if( availableFlagCol )
mergeCandList[ i++ ] = Col 6. The variable numCurrMergeCand and numOrigMergeCand are set equal to thenumber of merging candidates in the mergeCandList.

7. When numCurrMergeCand is less than (MaxNumMergeCand 1) and NumHmvpCandis greater than 0, the following applies:
The derivation process of history-based merging candidates as specified in 8.3.2.6 is invoked with mergeCandList, and numCurrMergeCand as inputs, andmodified mergeCandList and numCurrMergeCand as outputs.
numOrigMergeCand is set equal to numCurrMergeCand.

8. The derivation process for pairwise average merging candidates specified in clause 8.3.2.4 is invoked with mergeCandList, the reference indices refIdxL0N and refIdxL1N, the prediction list utilization flags predFlagL0N and predFlagL1N, the motion vectors mvL0N and mvL1N of every candidate N in mergeCandList, numCurrMergeCand and numOrigMergeCand as inputs, and the output is assigned tomergeCandList, numCurrMergeCand, the reference indices refIdxL0avgCand$_k$ and refIdxL1avgCand$_k$, the prediction list utilization flags predFlagL0avgCand$_k$ and predFlagL1avgCand$_k$ and the motion vectors mvL0avgCand$_k$ and mvL1avgCand$_k$ of every new candidate avgCand$_k$ being added into mergeCandList. The bi-prediction weight index gbiIdx of every new candidate avgCand$_k$ being added intomergeCandList is set equal to 0. The number of candidates being added, numAvgMergeCand, is set equal to ( numCurrMergeCand − numOrigMergeCand ). When numAvgMergeCand is greater than 0, k ranges from 0 to numAvgMergeCand − 1, inclusive.

9. The derivation process for zero motion vector merging candidates specified in clause 8.3.2.5 is invoked with the mergeCandList, the reference indicesrefIdxL0N and refIdxL1N, the prediction list utilization flags predFlagL0N and predFlagL1N,the motion vectors mvL0N and mvL1N of every candidate N in mergeCandList and numCurrMergeCand as inputs, and the output is assigned to mergeCandList, numCurrMergeCand, the reference indices refIdxL0zeroCand$_m$ and refIdxL1zeroCand$_m$, the prediction list utilization flags predFlagL0zeroCand$_m$ and predFlagL1zeroCand$_m$ and the motion vectors mvL0zeroCand$_m$ andmvL1zeroCand$_m$ of every new candidate zeroCand$_m$ being added into mergeCandList. The bi-prediction weight index gbiIdx ofevery new candidate zeroCand$_m$ being added intomergeCandList is set equal to 0. The number of candidates being added, numZeroMergeCand, is set equal to ( numCurrMergeCand − numOrigMergeCand − numAvgMergeCand ).When numZeroMergeCand is greater than 0, m ranges from 0 to numZeroMergeCand− 1, inclusive.

10. If mmvd_flag[ xCb ][ yCb ] is equal to 1, the variable mmvdCnt is set to 0. The following applies until mmvdCnt is greater than merge_idx[ xCb ][ yCb] or mmvdCnt is equal to MaxNumMergeCand:
mmvdCnt++;

11. The following assignments are made with N being the candidate atposition merge_idx[ xCb ][ yCb ] in the merging candidate listmergeCandList ( N = mergeCandList[ merge_idx[ xCb ][ yCb ]] ) and X being replaced by 0 or 1:
refIdxLX = refIdxLXN   (8-202)
predFlagLX[ 0 ][ 0 ] = predFlagLXN   (8-203)
mvLX[ 0 ][ 0 ][ 0 ] = mvLXN[ 0 ]   (8-204)
mvLX[ 0 ][ 0 ][ 1 ] = mvLXN[ 1 ]   (8-205)
gbiIdx = gbiIdxN   (8-206)

12. When mmvd_flag[ xCb ][ yCb ] is equal to 1, thefollowing applies:
The derivation process for merge motion vector difference as specified in 8.3.2.7 is invoked with the luma location ( xCb, yCb ), the luma motion vectors mvL0[ 0 ][ 0 ], mvL1[ 0 ][ 0 ], the reference indices refIdxL0, refIdxL1 and the prediction list utilization flags predFlagL0[ 0 ][ 0 ] and predFlagL1[ 0][ 0 ] as inputs, and the motion vector differences mMvdL0 and mMvdL1 as outputs.

TABLE 4-continued 1.1.1.2 Derivation process for luma motion vectors for merge mode The motion vector difference mMvdLX is added to the merge motion vectorsmvLX
for X being 0 and 1 as follows:
mvLX[ 0 ][ 0 ][ 0 ] += mMvdLX[ 0]          (8-207)
mvLX[ 0 ][ 0 ][ 1 ] += mMvdLX[ 1]          (8-208)

Figure 10:
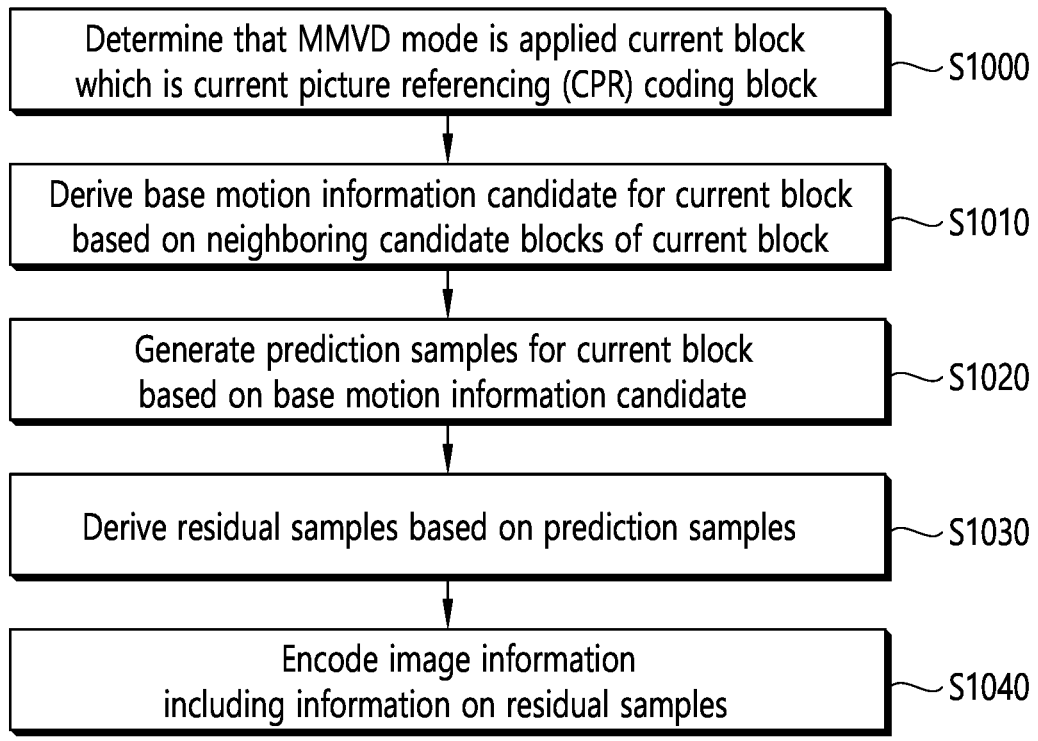
FIG. 10 is a flowchart schematically illustrating an encoding method that can be performed by an encoding apparatus according to an embodiment of the present disclosure.

FIG. 10 is a flowchart schematically illustrating an encoding method that can be performed by an encoding apparatus according to an embodiment of the present disclosure.

The method illustrated in FIG. 10 may be performed by the encoding apparatus 200 illustrated in FIG. 2. Specifically, steps S1000 to S1020 of FIG. 10 may be performed by the predictor 220 and the inter-predictor 221 illustrated in FIG. 2, step S1030 of FIG. 10 may be performed by the residual processor 230 illustrated in FIG. 2, and step S1040 of FIG. 10 may be performed by the entropy encoder 240 illustrated in FIG. 2. In addition, the method illustrated in FIG. 10 may include the above-described embodiments of the present disclosure. Accordingly, detailed description of the same parts in FIG. 10 as those in the above-described embodiments will be omitted or simplified.

Referring to FIG. 10, the encoding apparatus may determine that the merge with motion vector difference (MMVD) mode is applied to a current block that is a current picture referencing (CPR) coding block referring to the current picture (S1000).

In an embodiment, the encoding apparatus may compare RD costs based on various prediction modes and determine an optimal prediction mode for the current block. Here, the encoding apparatus may determine whether to apply the MMVD mode to the current block that is a CPR coding block as an optimal prediction mode based on RD costs. In addition, the encoding apparatus may generate MMVD flag information indicating whether the MMVD mode is applied to the current block to derive motion information according to a result of the determination. Further, the encoding apparatus may encode the MMVD flag information and signal the encoded MMVD flag information to the decoding apparatus.

The encoding apparatus may derive base motion information candidates for the current block based on neighboring candidate blocks of the current block (S1010). In an embodiment, the encoding apparatus may derive the base motion information candidates based on whether neighboring candidate blocks of the current block are CPR coding blocks.

As a specific example, the encoding apparatus may derive neighboring candidate blocks of the current block. Here, the neighboring candidate blocks may be neighboring blocks spatially adjacent to the current block and may include, for example, a bottom left neighboring block, a left neighboring block, a top right neighboring block, a top neighboring block, and a top left neighboring block of the current block. For example, the encoding apparatus may search the neighboring candidate blocks based on priority to detect available candidate blocks and derive motion information of the detected candidate blocks. Here, the motion information of the available candidate blocks may be used as motion information candidates (e.g., spatial merge candidates) in a motion candidate list.

Furthermore, the neighboring candidate blocks may further include a temporal neighboring block, and the temporal neighboring block may be searched in the order of a bottom right neighboring block and a bottom right center block of a co-located block for the current block in a col picture. For example, the encoding apparatus may detect an available temporal neighboring block and derive motion information of the detected block. Here, the motion information of the available temporal neighboring block may be used as a motion information candidate (e.g., temporal merge candidate) in the motion candidate list.

Upon detection of the neighboring candidate blocks as described above, the encoding apparatus may derive the base motion information candidates used in the MMVD mode based on whether the neighboring candidate blocks are CPR coding blocks.

In addition, the encoding apparatus may derive neighboring candidate blocks as described above to configure a motion information candidate list (e.g., merge candidate list). The motion information candidate list may include a predetermined number of motion information candidates, for example, five candidates. Here, the motion information candidate list may include the aforementioned base motion information candidates. For example, the number of base motion information candidates included in the motion information candidate list may be determined to be equal to or less than a total number of (e.g., five) motion information candidates for the motion information candidate list, for example, two. For example, two base motion information candidates may be indexed in first and second order among the candidates in the motion information list. In this case, the encoding apparatus may signal selection information (e.g., merge candidate flag mmvd_cand_flag) indicating one of the two base motion information candidates with respect to the current block to which MMVD is applied to the decoding apparatus.

In derivation of base motion information candidates according to an embodiment, the base motion information candidates may be derived based on whether a reference picture list for the current block includes only the current picture or one or more reference pictures other than the current picture.

In an embodiment, when only the current picture is included in the reference picture list, the encoding apparatus may derive a neighboring candidate block corresponding to CPR coding block among neighboring candidate blocks and derive a base motion information candidate based on motion information of the neighboring candidate block corresponding to the CPR coding block. Alternatively, when only the current picture is included in the reference picture list, the encoding apparatus may configure a base motion information candidate using a zero vector when all of the neighboring candidate blocks are not CPR coding blocks. Further, if the neighboring candidate blocks are not available (e.g., if the neighboring candidate blocks are blocks coded in the intra prediction mode), and thus base motion information candidates are not fully filled, the encoding apparatus may configure the base motion information candidate using a zero vector.

As another embodiment, if one or more reference pictures other than the current picture are included in the reference picture list, the encoding apparatus may derive base motion information candidates based on at least one of motion information of a first neighboring candidate block that is a CPR coding block and motion information of a second neighboring candidate block that is not a CPR coding block from among the neighboring candidate blocks. That is, if one or more reference pictures other than the current picture are included in the reference picture list, the encoding apparatus may use both a neighboring candidate block that is a CPR coding block and a neighboring candidate block that is not a CPR coding block as base motion information candidates. Here, if all of the neighboring candidate blocks are not available (e.g., if the neighboring candidate blocks are blocks coded in the intra prediction mode), and thus base motion information candidates are not fully filled, the encoding apparatus may configure the base motion information candidates using a zero vector.

The encoding apparatus may generate prediction samples for the current block based on the base motion information candidates (S1020).

In an embodiment, the encoding apparatus may derive motion information of the current block based on the base motion information candidates and MVD for the current block to which MMVD is applied and generate prediction samples based on the motion information.

As a specific example, when MMVD is applied to the current block, the encoding apparatus may generate a distance index indicating a motion vector difference magnitude and a direction index indicating a motion direction. For example, the distance index may be the aforementioned mmvd_distance jdx and the direction index may be the aforementioned mmvd_direction jdx. The encoding apparatus may derive a distance index value based on MVD magnitude (e.g., MmvdDistance) shown in Table 1 and derive a direction index value based on a MVD sign (e.g., MmvdSign) shown in Table 2. In addition, the encoding apparatus may perform encoding based on the distance index and the direction index and signal the same to the decoding apparatus.

Furthermore, the encoding apparatus may derive a motion vector difference (MVD) based on the distance index and the direction index. For example, the MVD may be calculated according to the aforementioned Equation 1.

The encoding apparatus may derive motion information of the current block based on the base motion information candidate and the MVD. For example, the motion information (i.e., motion vector) of the current block may be derived by adding the MVD calculated according to Equation 1 to the base motion information candidate (i.e., base motion vector). The encoding apparatus may generate prediction samples based on a reference block indicated by the motion information (i.e., motion vector) in the current picture or a reference picture in the reference picture list.

The encoding apparatus may derive residual samples with respect to the current block based on the prediction samples (S1030).

The encoding apparatus may derive the residual samples based on original samples of the current block and the prediction samples of the current block and generate information on the residual samples. Here, the information on the residual samples may include information on values and positions of quantized transform coefficients derived by performing transform and quantization on the residual samples, a transform technique, a transform kernel, quantization parameters, etc.

The encoding apparatus may encode image information including the information on the residual samples (S1040).

That is, the encoding apparatus may encode the information on the residual samples to generate a bitstream and transmit the bitstream to the decoding apparatus through a network or a storage medium. Furthermore, the encoding apparatus may encode image information (e.g., MMVD candidate flag information, the distance index, and the direction index) derived in the above-described process to generate a bitstream.

Figure 11:
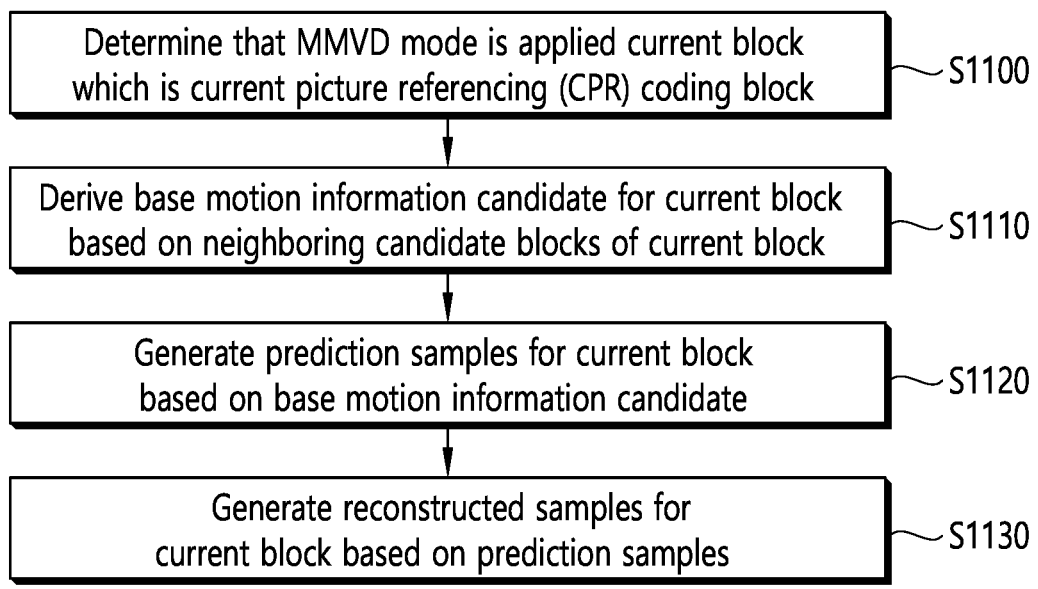
FIG. 11 is a flowchart schematically illustrating a decoding method that can be performed by a decoding apparatus according to an embodiment of the present disclosure.

FIG. 11 is a flowchart schematically illustrating a decoding method that can be performed by a decoding apparatus according to an embodiment of the present disclosure.

The method illustrated in FIG. 11 may be performed by the decoding apparatus 300 illustrated in FIG. 3. Specifically, steps S1100 to S1120 of FIG. 11 may be performed by the predictor 330 and the inter-predictor 332 illustrated in FIG. 3 and step S1130 of FIG. 11 may be performed by the adder 340 illustrated in FIG. 3. In addition, the method illustrated in FIG. 11 may include the above-described embodiments of the present disclosure. Accordingly, detailed description of the same parts in FIG. 11 as those in the above-described embodiments will be omitted or simplified.

Referring to FIG. 11, the decoding apparatus may determine that the merge with motion vector difference (MMVD) mode is applied to a current block that is a current picture referencing (CPR) coding block referring to the current picture (S1100).

In an embodiment, the decoding apparatus may obtain MMVD flag information indicating whether MMVD is applied to the current block to derive motion information. For example, the MMVD flag information may be the aforementioned mmvd_flag. When a value of the MMVD flag information (e.g., mmvd_flag) is equal to 1, it represents that MMVD is applied to the current block to derive motion information, and when the value of the MMVD flag information (e.g., mmvd_flag) is equal to 0, it represents that MMVD is not applied to the current block. That is, the decoding apparatus may decode the MMVD flag information signaled by the encoding apparatus to determine whether to apply MMVD to the current block.

The decoding apparatus may derive base motion information candidates for the current block based on neighboring candidate blocks of the current block (S1110). In an embodiment, the decoding apparatus may derive the base motion information candidates based on whether neighboring candidate blocks of the current block are CPR coding blocks.

As a specific example, the decoding apparatus may derive neighboring candidate blocks of the current block. Here, the neighboring candidate blocks may be neighboring blocks spatially adjacent to the current block and may include, for example, a bottom left neighboring block, a left neighboring block, a top right neighboring block, a top neighboring block, and a top left neighboring block of the current block. For example, the decoding apparatus may search the neighboring candidate blocks based on priority to detect available candidate blocks and derive motion information of the detected candidate blocks. Here, the motion information of the available candidate blocks may be used as motion information candidates (e.g., spatial merge candidates) in a motion candidate list.

Furthermore, the neighboring candidate blocks may further include a temporal neighboring block, and the temporal neighboring block may be searched in the order of a bottom right neighboring block and a bottom right center block of a co-located block for the current block in a col picture. For example, the decoding apparatus may detect an available temporal neighboring block and derive motion information of the detected block. Here, the motion information of the available temporal neighboring block may be used as a motion information candidate (e.g., temporal merge candidate) in the motion candidate list.

Upon detection of the neighboring candidate blocks as described above, the decoding apparatus may derive base motion information candidates used in the MMVD mode based on whether the neighboring candidate blocks are CPR coding blocks.

In addition, the decoding apparatus may derive neighboring candidate blocks as described above to configure a motion information candidate list (e.g., merge candidate list). The motion information candidate list may include a predetermined number of motion information candidates, for example, five candidates. Here, the motion information candidate list may include the aforementioned base motion information candidates. For example, the number of base motion information candidates included in the motion information candidate list may be determined to be equal to or less than a total number of (e.g., five) motion information candidates for the motion information candidate list, for example, two. For example, two base motion information candidates may be indexed in first and second order among the candidates in the motion information list. In this case, the decoding apparatus may obtain selection information (e.g., merge candidate flag mmvd_cand_flag) indicating one of the two base motion information candidates with respect to the current block to which MMVD is applied. Here, the selection information may be signaled by the encoding apparatus. That is, the decoding apparatus may select one base motion information candidate in the motion information candidate list based on the selection information.

In derivation of base motion information candidates according to an embodiment, the base motion information candidates may be derived based on whether a reference picture list for the current block includes only the current picture or one or more reference pictures other than the current picture.

In an embodiment, when only the current picture is included in the reference picture list, the decoding apparatus may derive a neighboring candidate block corresponding to CPR coding block among neighboring candidate blocks and derive a base motion information candidate based on motion information of the neighboring candidate block corresponding to the CPR coding block. Alternatively, when only the current picture is included in the reference picture list, the decoding apparatus may configure a base motion information candidate using a zero vector when all of the neighboring candidate blocks are not CPR coding blocks. Further, if the neighboring candidate blocks are not available (e.g., if the neighboring candidate blocks are blocks coded in the intra prediction mode), and thus base motion information candidates are not fully filled, the decoding apparatus may configure the base motion information candidate using a zero vector.

As another embodiment, if one or more reference pictures other than the current picture are included in the reference picture list, the decoding apparatus may derive base motion information candidates based on at least one of motion information of a first neighboring candidate block that is a CPR coding block and motion information of a second neighboring candidate block that is not a CPR coding block among the neighboring candidate blocks. That is, if one or more reference pictures other than the current picture are included in the reference picture list, the decoding apparatus may use both a neighboring candidate block that is a CPR coding block and a neighboring candidate block that is not a CPR coding block as base motion information candidates. Here, if all of the neighboring candidate blocks are not available (e.g., if the neighboring candidate blocks are blocks coded in the intra prediction mode), and thus base motion information candidates are not fully filled, the decoding apparatus may configure the base motion information candidates using a zero vector.

The decoding apparatus may generate prediction samples for the current block based on the base motion information candidates (S1120).

In an embodiment, the decoding apparatus may derive motion information of the current block based on the base motion information candidates and MVD for the current block to which MMVD is applied and generate prediction samples based on the motion information.

As a specific example, when MMVD is applied to the current block, the decoding apparatus may obtain a distance index indicating a motion vector difference magnitude and a direction index indicating a motion direction. For example, the distance index and the direction index may be included in a bitstream and signaled by the encoding apparatus. For example, the distance index may be the aforementioned mmvd_distance jdex and the direction index may be the aforementioned mmvd_direction_idx.

The decoding apparatus may derive a MVD magnitude (e.g., MmvdDistance) based on a value of the distance index (e.g., mmvd_distance jdx) shown in Table 1 and derive a MVD sign (e.g., MmvdSign) based on a value of the direction index (e.g., mmvd_direction_idx) shown in Table 2. In addition, the decoding apparatus may derive a motion vector difference (MVD) based on the distance index and the direction index. For example, the MVD may be calculated according to Equation 1.

The decoding apparatus may derive motion information of the current block based on the base motion information candidate and the MVD. For example, the motion information (i.e., motion vector) of the current block may be derived by adding the MVD calculated according to Equation 1 to the base motion information candidate (i.e., base motion vector). The decoding apparatus may generate prediction samples based on a reference block indicated by the motion information (i.e., motion vector) in the current picture or a reference picture in the reference picture list.

The decoding apparatus may generate reconstructed samples with respect to the current block based on the prediction samples (S1130).

As an embodiment, the decoding apparatus may receive information on residual with respect to the current block and derive residual samples (or a residual sample array) with respect to the current block based on the information. Here, the information on residual may include a transform coefficient with respect to the residual samples. The decoding apparatus may generate reconstructed samples based on the prediction samples and the residual samples and device a reconstructed block or a reconstructed picture based on the reconstructed samples.

In the above-described embodiments, the methods are explained based on flowcharts by means of a series of steps or blocks, but the present disclosure is not limited to the order of steps, and a certain step may be performed in order or step different from that described above, or concurrently with another step. Further, it may be understood by a person having ordinary skill in the art that the steps shown in a flowchart are not exclusive, and that another step may be incorporated or one or more steps of the flowchart may be removed without affecting the scope of the present disclosure.

The above-described methods according to the present disclosure may be implemented as a software form, and an encoding apparatus and/or decoding apparatus according to the disclosure may be included in a device for image processing, such as, a TV, a computer, a smartphone, a set-top box, a display device or the like.

When embodiments in the present disclosure are embodied by software, the above-described methods may be embodied as modules (processes, functions or the like) to perform the above-described functions. The modules may be stored in a memory and may be executed by a processor. The memory may be inside or outside the processor and may be connected to the processor in various well-known manners. The processor may include an application-specific integrated circuit (ASIC), other chipset, logic circuit, and/or a data processing device. The memory may include a read-only memory (ROM), a random access memory (RAM), a flash memory, a memory card, a storage medium, and/or other storage device. That is, embodiments described in the present disclosure may be embodied and performed on a processor, a microprocessor, a controller or a chip. For example, function units shown in each drawing may be embodied and performed on a computer, a processor, a microprocessor, a controller or a chip. In this case, information for implementation (ex. information on instructions) or an algorithm may be stored in a digital storage medium.

Furthermore, the decoding apparatus and the encoding apparatus to which the present disclosure is applied may be included in a multimedia broadcasting transmission and reception device, a mobile communication terminal, a home cinema video device, a digital cinema video device, a camera for monitoring, a video dialogue device, a real-time communication device such as video communication, a mobile streaming device, a storage medium, a camcorder, a video on-demand (VoD) service provision device, an over the top (OTT) video device, an Internet streaming service provision device, a three-dimensional (3D) video device, a virtual reality (VR) device, an augmented reality (AR) device, a video telephony device, transportation means terminal (e.g., a vehicle (including autonomous vehicle) terminal, an aircraft terminal, and a vessel terminal), and a medical video device, and may be used to process a video signal or a data signal. For example, the over the top (OTT) video device may include a game console, a Blueray player, Internet access TV, a home theater system, a smartphone, a tablet PC, and a digital video recorder (DVR).

Furthermore, the processing method to which the present disclosure is applied may be produced in the form of a program executed by a computer, and may be stored in a computer-readable recording medium. Multimedia data having a data structure according to the present disclosure may also be stored in a computer-readable recording medium. The computer-readable recording medium includes all types of storage devices in which computer-readable data is stored. The computer-readable recording medium may include Blueray disk (BD), a universal serial bus (USB), a ROM, a PROM, an EPROM, an EEPROM, a RAM, a CD-ROM, a magnetic tape, a floppy disk, and an optical data storage device, for example. Furthermore, the computer-readable recording medium includes media implemented in the form of carriers (e.g., transmission through the Internet). Furthermore, a bit stream generated using an encoding method may be stored in a computer-readable recording medium or may be transmitted over wired and wireless communication networks.

Furthermore, an embodiment of the present disclosure may be implemented as a computer program product using program code. The program code may be performed by a computer according to an embodiment of the present disclosure. The program code may be stored on a carrier readable by a computer.

Figure 12:
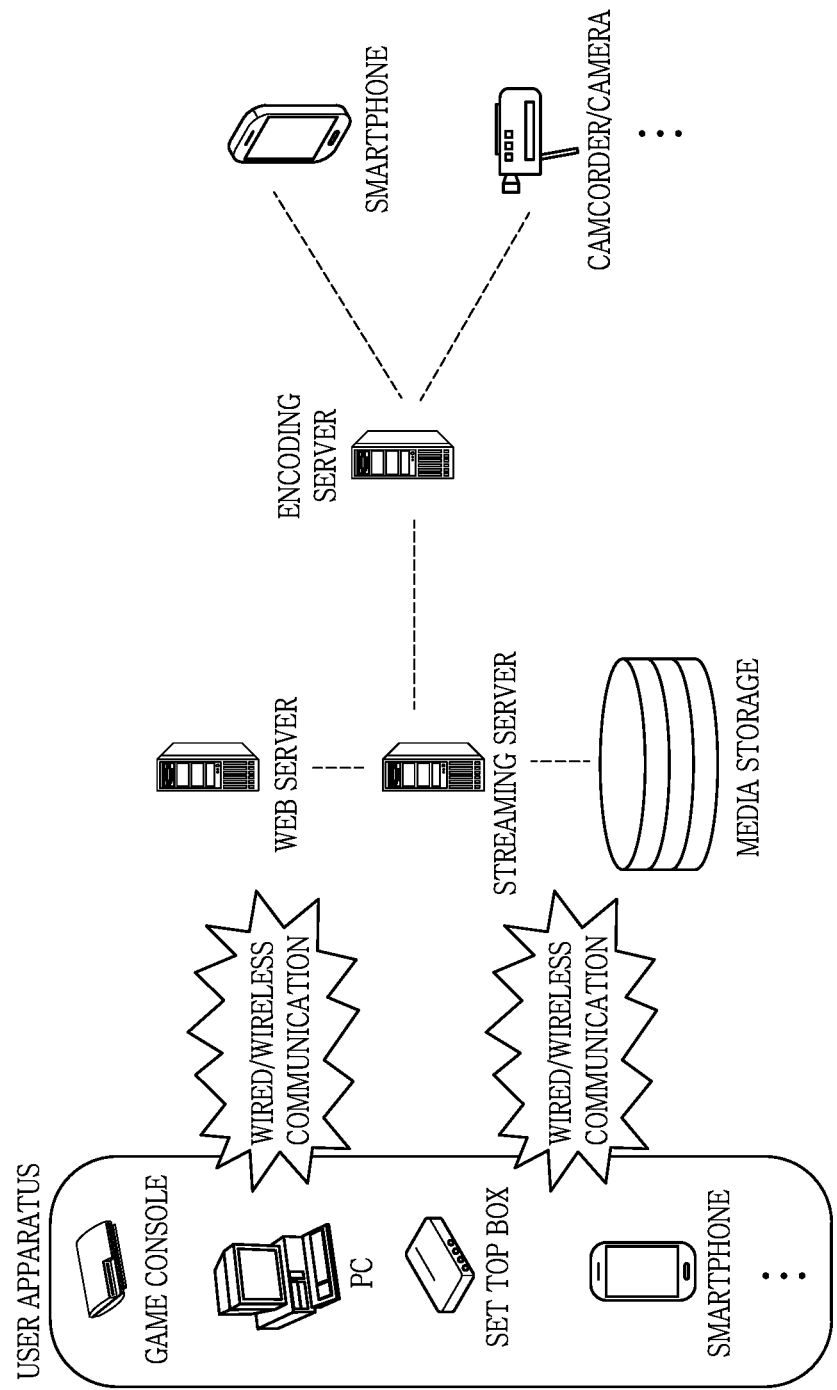
FIG. 12 illustrates an example of a content streaming system to which embodiments of the present disclosure may be applied.

FIG. 12 illustrates an example of a content streaming system to which embodiments disclosed in the present disclosure may be applied.

Referring to FIG. 12, the content streaming system to which the embodiments of the present document are applied may basically include an encoding server, a streaming server, a web server, a media storage, a user device, and a multimedia input device.

The encoding server compresses content input from multimedia input devices such as a smartphone, a camera, a camcorder, etc. into digital data to generate a bitstream and transmit the bitstream to the streaming server. As another example, when the multimedia input devices such as smartphones, cameras, camcorders, etc. directly generate a bitstream, the encoding server may be omitted.

The bitstream may be generated by an encoding method or a bitstream generating method to which the embodiment(s) of the present document is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (ex. smartwatches, smart glasses, head mounted displays), digital TVs, desktops computer, digital signage, and the like.

Each server in the content streaming system may be operated as a distributed server, in which case data received from each server may be distributed.

What is claimed is:

1. An image decoding method performed by a decoding apparatus, the image decoding method comprising:
    determining that a merge with motion vector difference (MMVD) mode is applied to a current block which is a current picture referencing (CPR) coding block referring to a current picture;
    determining whether a reference picture list for the current block includes only the current picture or includes one or more reference pictures other than the current picture;

deriving a base motion information candidate based on motion information of a neighboring candidate block which is the CPR coding block among neighboring candidate blocks;

generating prediction samples for the current block based on the base motion information candidate; and generating reconstructed samples for the current block based on the prediction samples, wherein the base motion information candidate is derived based on the motion information of the neighboring candidate block which is the CPR coding block when the reference picture list includes only the current picture.

2. The image decoding method of claim 1, wherein a zero vector is configured as the base motion information candidate when all the neighboring candidate blocks are not CPR coding blocks.

3. The image method of claim 1, further comprising configuring a motion information candidate list for the current block, wherein the motion information candidate list includes the base motion information candidate.

4. The image method of claim 3, wherein a number of base motion information candidates included in the motion information candidate list is two, and selection information indicating one of the two base motion information candidates is signaled for the current block to which the MMVD mode is applied.

5. The image decoding method of claim 1, wherein the deriving of the base motion information candidate for the current block comprises deriving the base motion information candidate based on at least one of motion information of a first neighboring candidate block which is a CPR coding block or motion information of a second neighboring candidate block which is not a CPR coding block among the neighboring candidate blocks.

6. The image method of claim 5, further comprising determining whether the reference picture list for the current block includes only the current picture or includes one or more reference pictures other than the current picture, wherein, when the reference picture list includes one or more reference pictures other than the current picture, the base motion information candidate is derived based on at least one of the motion information of the first neighboring candidate block which is the CPR coding block or the motion information of the second neighboring candidate block which is not the CPR coding block.

7. The image method of claim 1, wherein a zero vector is configured as the base motion information candidates when all the neighboring candidate blocks are not available.

8. A image method performed by an encoding apparatus, the image method comprising:

determining that a merge with motion vector difference (MMVD) mode is applied to a current block which is a current picture referencing (CPR) coding block referring to a current picture;

determining whether a reference picture list for the current block includes only the current picture or includes one or more reference pictures other than the current picture;

deriving a base motion information candidate based on motion information of a neighboring candidate block which is the CPR coding block among neighboring candidate blocks;

generating prediction samples for the current block based on the base motion information candidate;

deriving residual samples based on the prediction samples; and encoding image information including information on the residual samples, wherein the base motion information candidate is derived based on the motion information of the neighboring candidate block which is the CPR coding block when the reference picture list includes only the current picture.

9. The image method of claim 8, wherein a zero vector is configured as the base motion information candidate when all the neighboring candidate blocks are not CPR coding blocks.

10. The image method of claim 8, wherein the deriving of the base motion information candidate for the current block comprises deriving the base motion information candidate based on at least one of motion information of a first neighboring candidate block which is a CPR coding block or motion information of a second neighboring candidate block which is not a CPR coding block among the neighboring candidate blocks.

11. The image method of claim 10, further comprising determining whether the reference picture list for the current block includes only the current picture or includes one or more reference pictures other than the current picture, wherein, when the reference picture list includes one or more reference pictures other than the current picture, the base motion information candidate is derived based on at least one of the motion information of the first neighboring candidate block which is the CPR coding block or the motion information of the second neighboring candidate block which is not the CPR coding block.

12. The image method of claim 8, wherein a zero vector is configured as the base motion information candidate when all the neighboring candidate blocks are not available.

* * * * *